United States Patent [19]
Jones

[11] Patent Number: 4,741,576
[45] Date of Patent: May 3, 1988

[54] DUMP HOIST

[76] Inventor: Eldon D. Jones, R.R. 2, Lake Crystal, Minn. 56055

[21] Appl. No.: 744,367

[22] Filed: Jun. 13, 1985

Related U.S. Application Data

[63] Continuation-in-part of Ser. No. 571,421, Jan. 17, 1984, abandoned.

[51] Int. Cl.$^4$ ............................................... B60P 1/20
[52] U.S. Cl. ................................... 298/22 J; 254/9 C
[58] Field of Search ................. 298/19 B, 19 R, 22 B, 298/22 D, 22 R, 22 J; 254/3 C, 9 C

[56] References Cited

U.S. PATENT DOCUMENTS

| | | | |
|---|---|---|---|
| 2,144,599 | 1/1939 | Anthony | 298/22 B |
| 2,358,224 | 9/1944 | Golay | 298/22 B |
| 2,488,790 | 11/1949 | Wood | 298/22 B |
| 2,836,460 | 5/1958 | Lundell | 298/22 J |
| 3,791,695 | 2/1974 | Seniuk | 298/22 J |
| 4,302,050 | 11/1981 | Jones | 298/22 J |

FOREIGN PATENT DOCUMENTS

| | | |
|---|---|---|
| 722518 | 11/1965 | Canada. |
| 959096 | 12/1974 | Canada. |
| A2049566 | 12/1980 | United Kingdom. |

OTHER PUBLICATIONS

Information Disclosure Statement, Eldon D. Jones, Ser. No. 571,421, filed 6/4/84, with drawing.
Supplement Response, Geoffrey R. Myers, Ser. No. 571,421, filed 2/20/85.
Letter, Eldon D. Jones and Geoffrey R. Myers, Dated 12/20/84, and Attachments (12).

*Primary Examiner*—Robert J. Spar
*Assistant Examiner*—Janice Krizek
*Attorney, Agent, or Firm*—Pollock, Vande Sande & Priddy

[57] ABSTRACT

A hoist mechanism is provided that includes a first and a second lifting arm connected at a first pivot point, a hydraulic cylinder connected to said lifting arms, and a stop located on one end of the second lifting arm. During the initial lifting of the hoist mechanism the first arm remains stationary as the second lifting arm rotates around the first pivot point. The hoist mechanism functions in this manner until the two lifting arms reach a predetermined angle with each other. When the lifting arms reach this angle, the stop acts to convert the action of the hoist mechanism into that resembling a scissors hoist, with both lifting arms rotating, as the hoist mechanism is further extended. The hoist mechanism is designed such that the effective length of the second lifting arm is constantly increasing as the second lifting arm rotates from the rest position to the predetermined angle. This is accomplished in certain embodiments including a shaft attached to the dump bed and a track which is a part of the second lifting arm. The shaft and the track function as a slidable connection which transmits the weight of the dump bed and its payload onto the hoist assembly. The shaft is confined within the track and moves back and forth therein as the dump bed is raised and lowered.

46 Claims, 16 Drawing Sheets

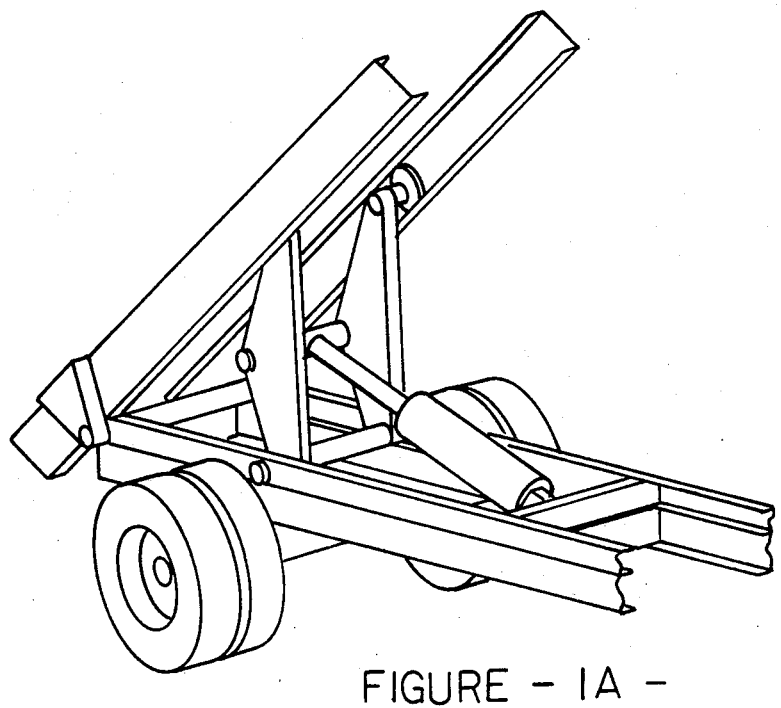
FIGURE - 1A -
PRIOR ART
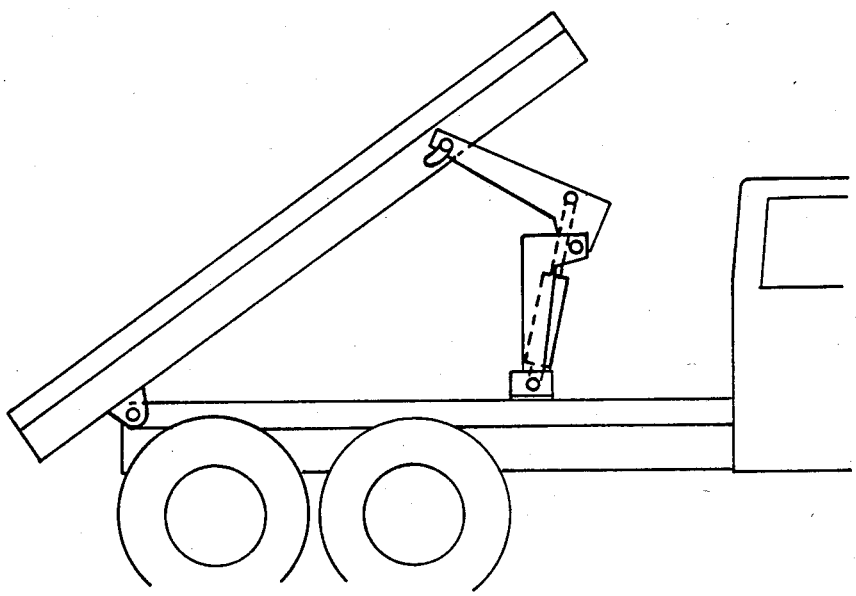
FIGURE - 1B -
PRIOR ART

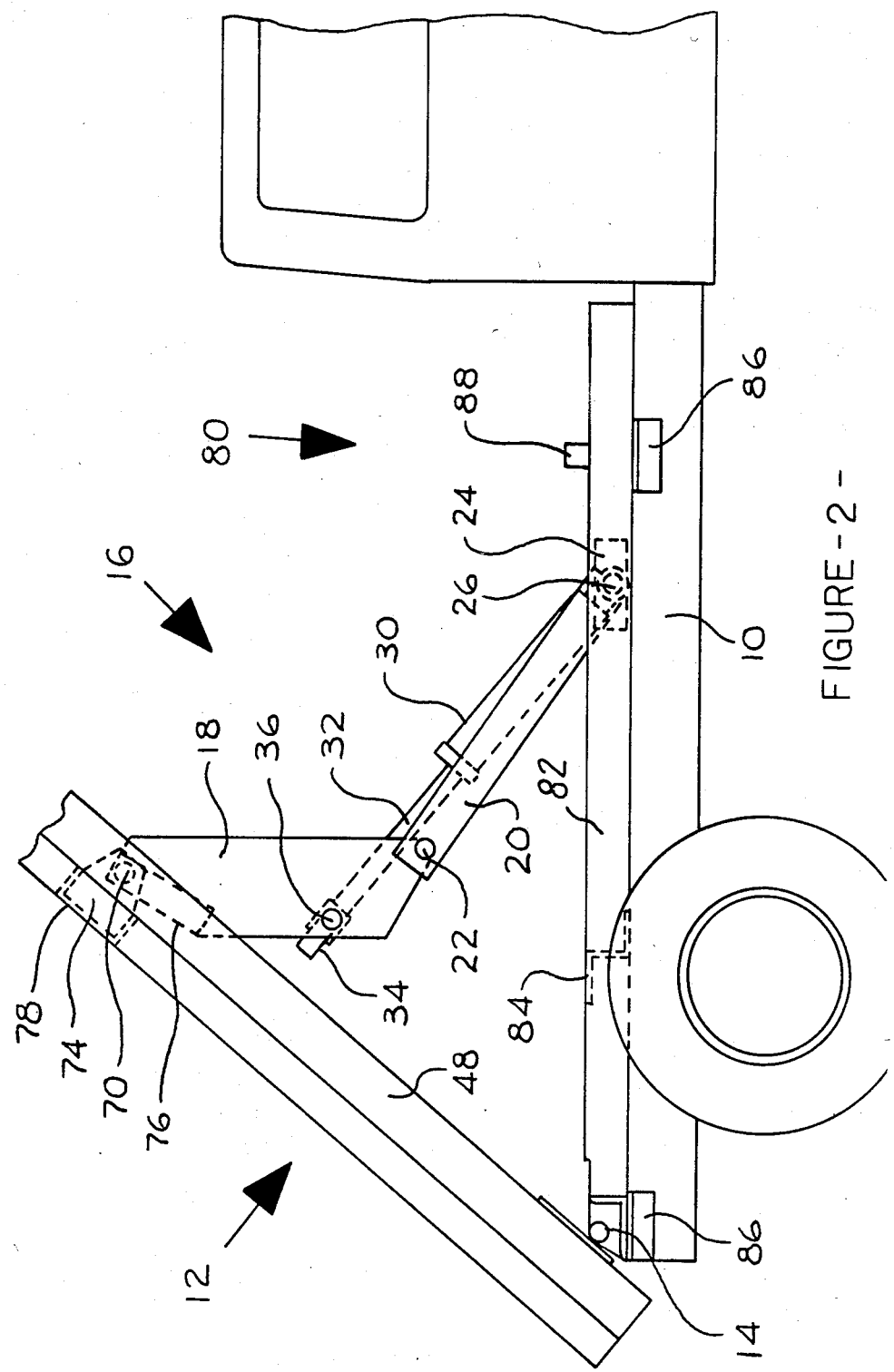
FIGURE-2-

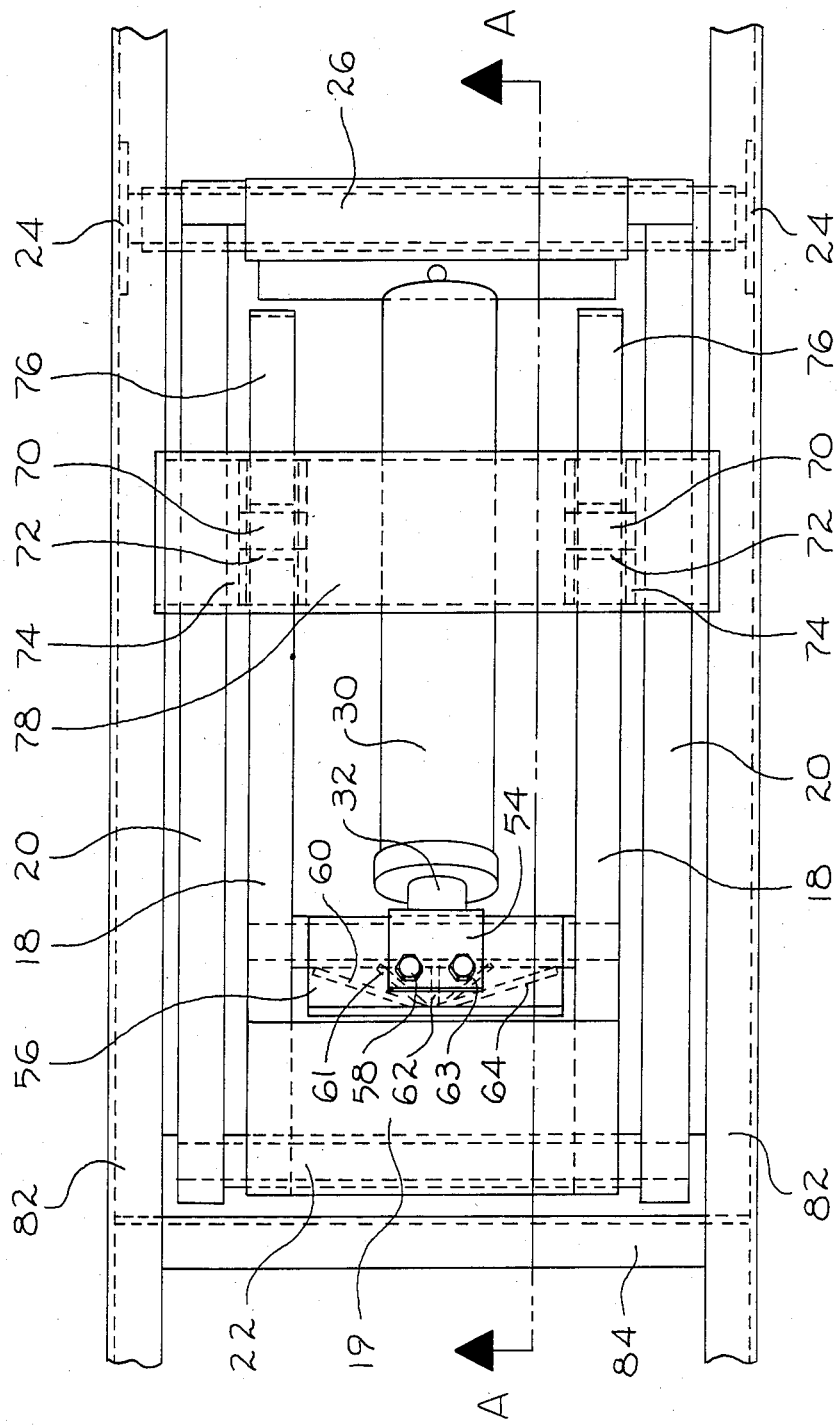
FIGURE - 3 -

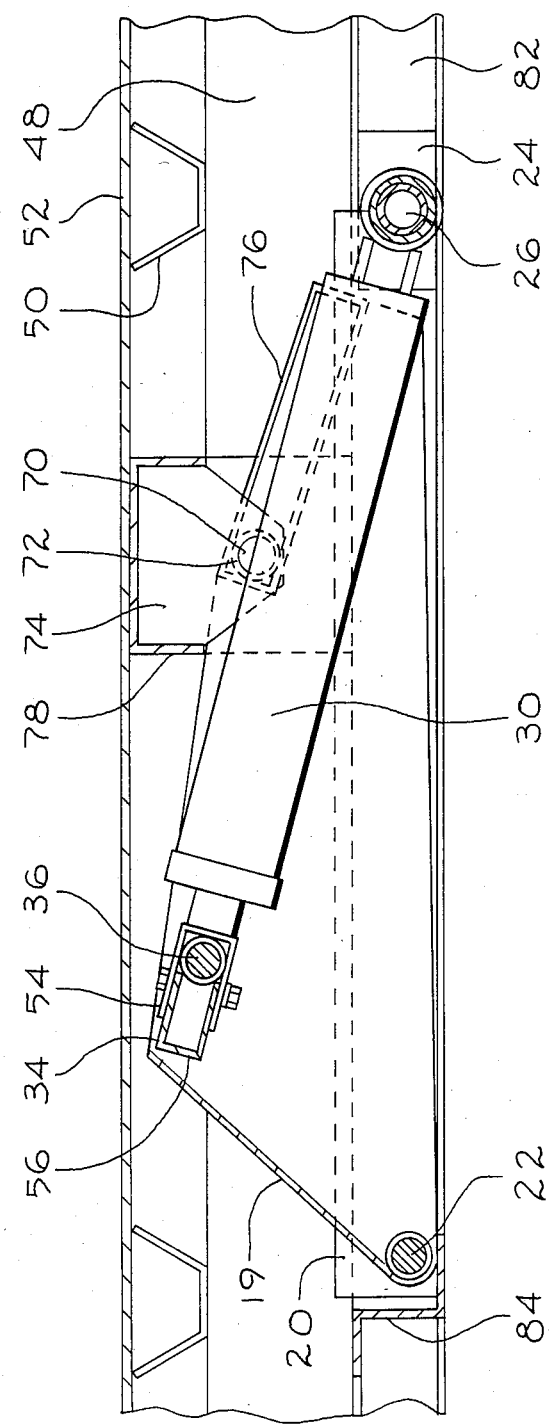

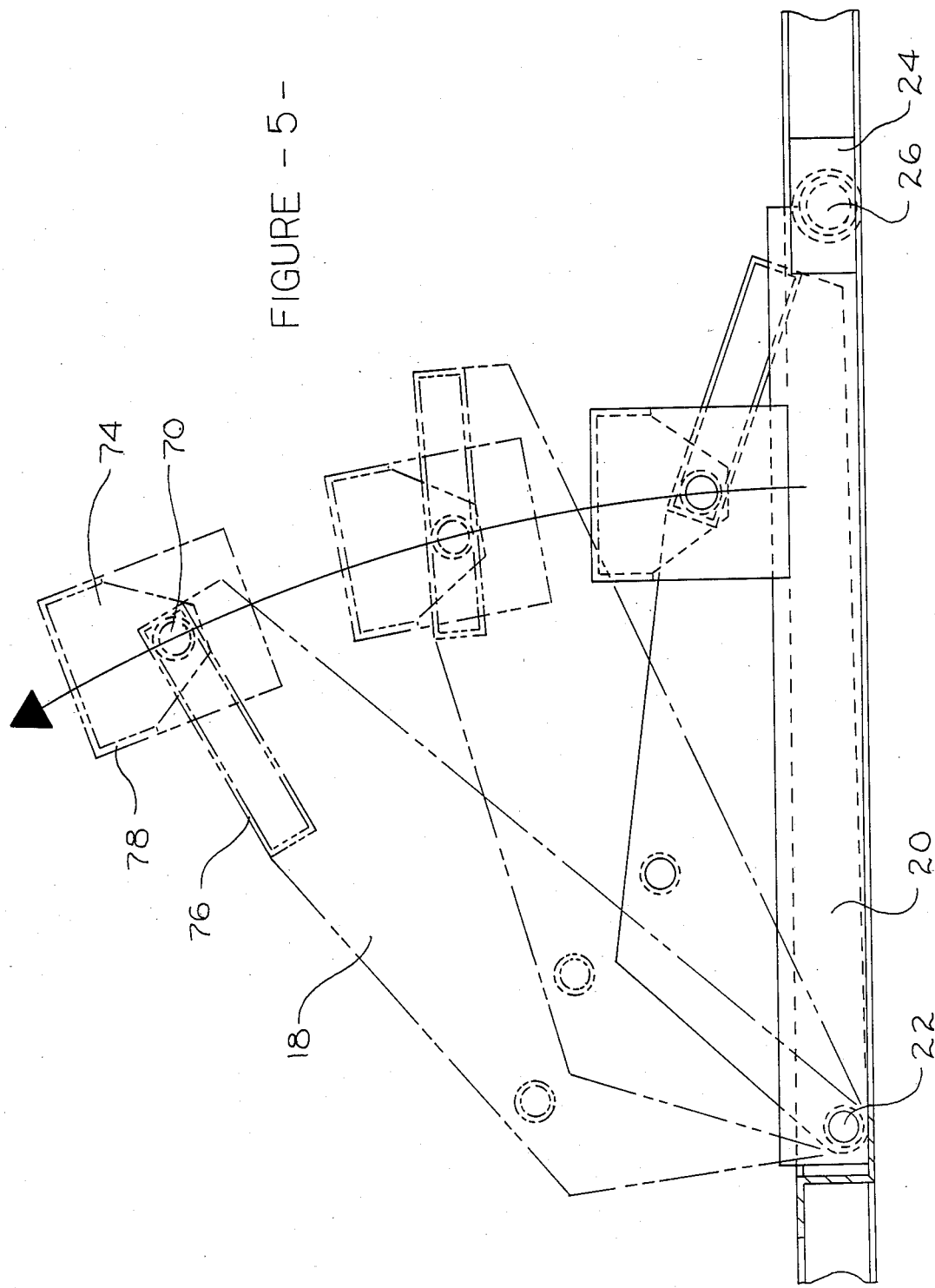

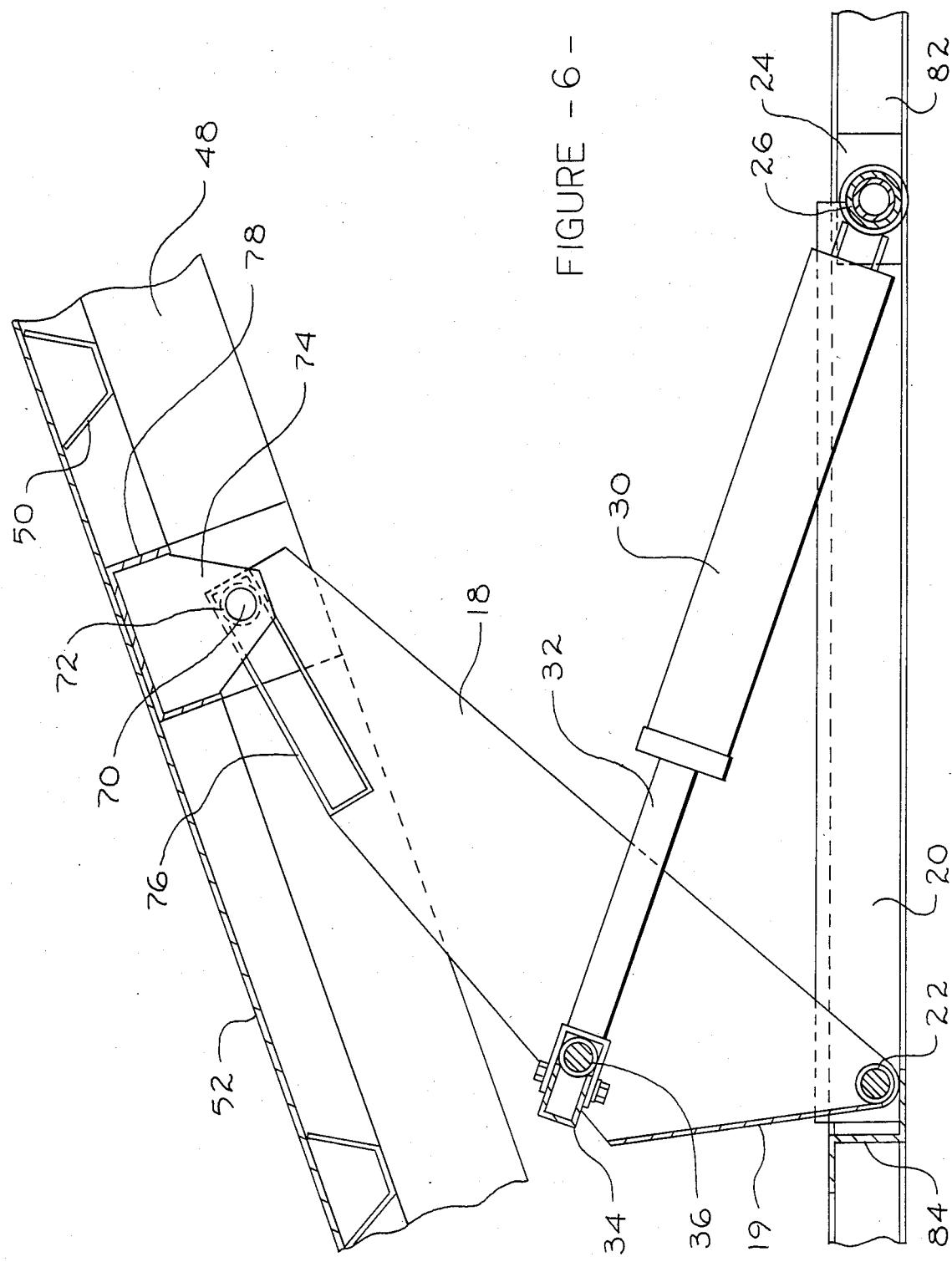

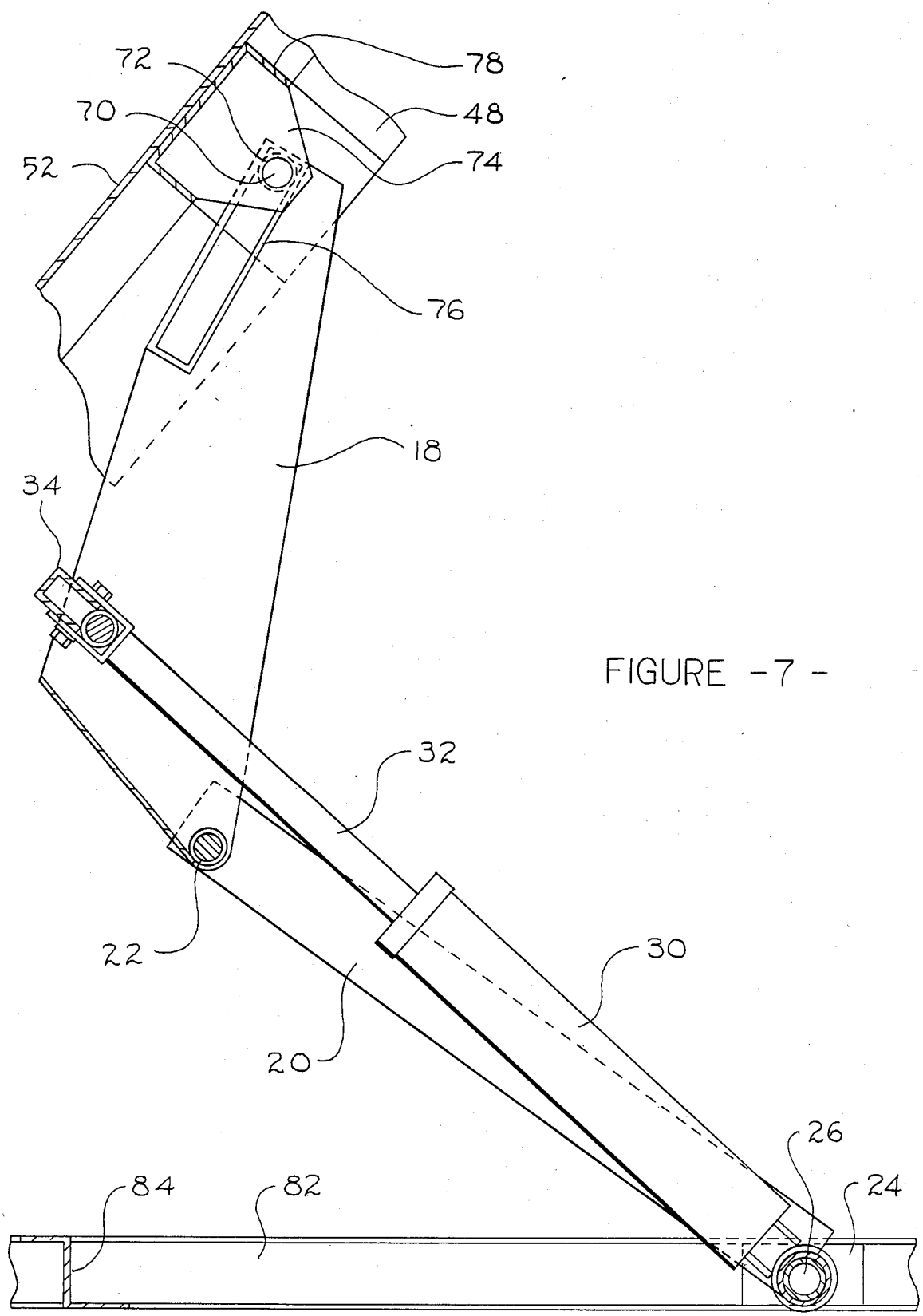
FIGURE -7-

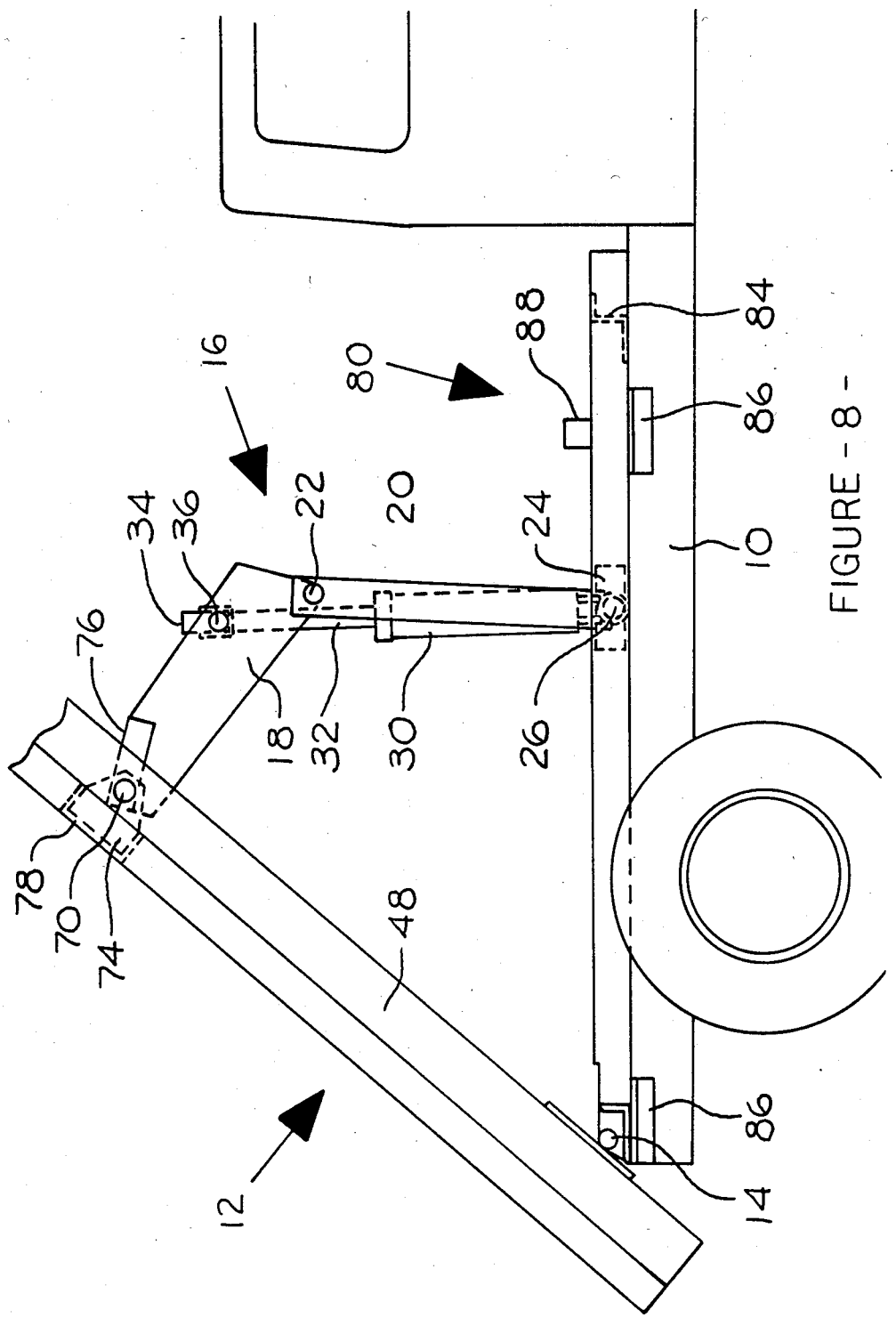
FIGURE - 8 -

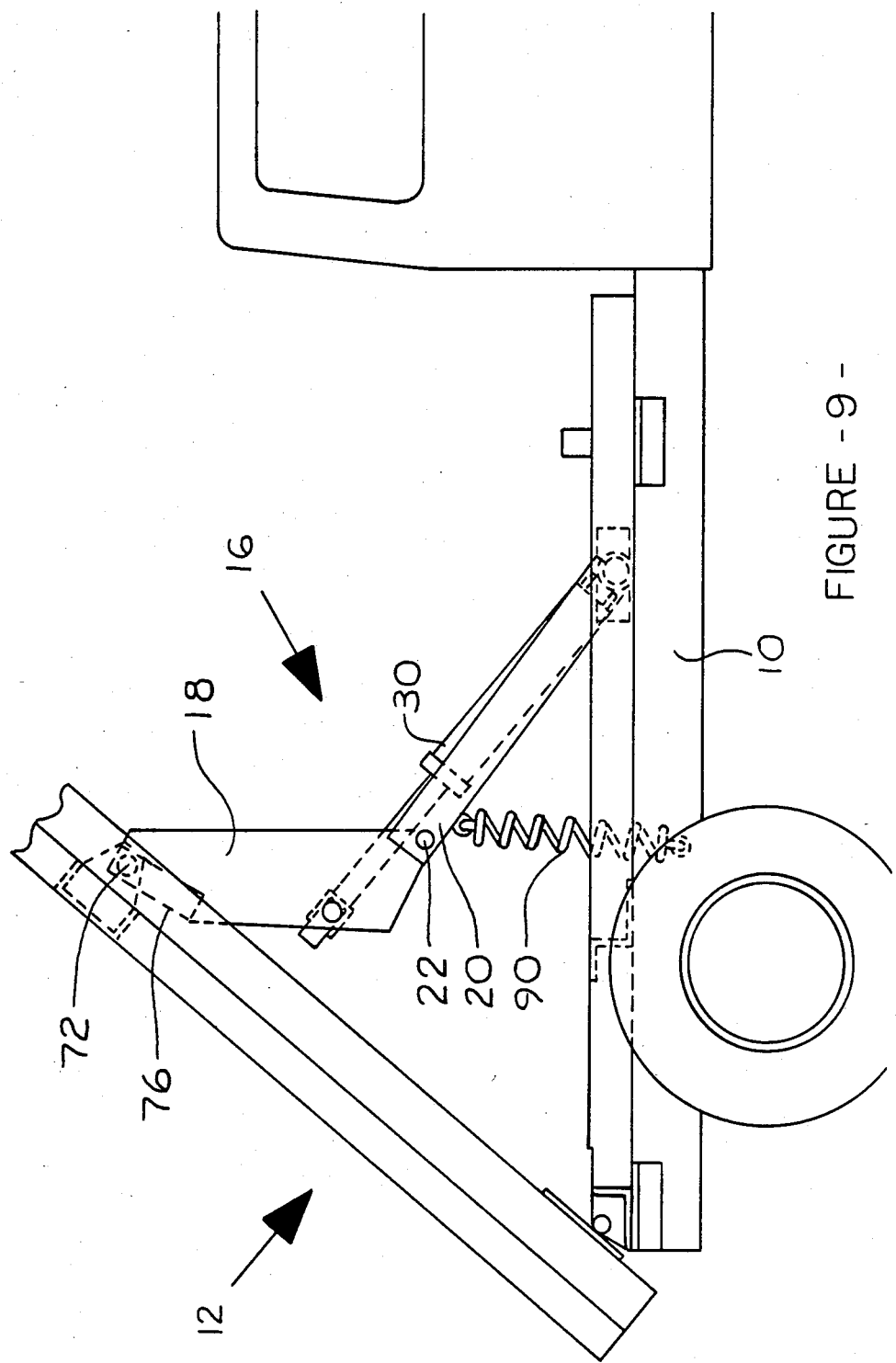

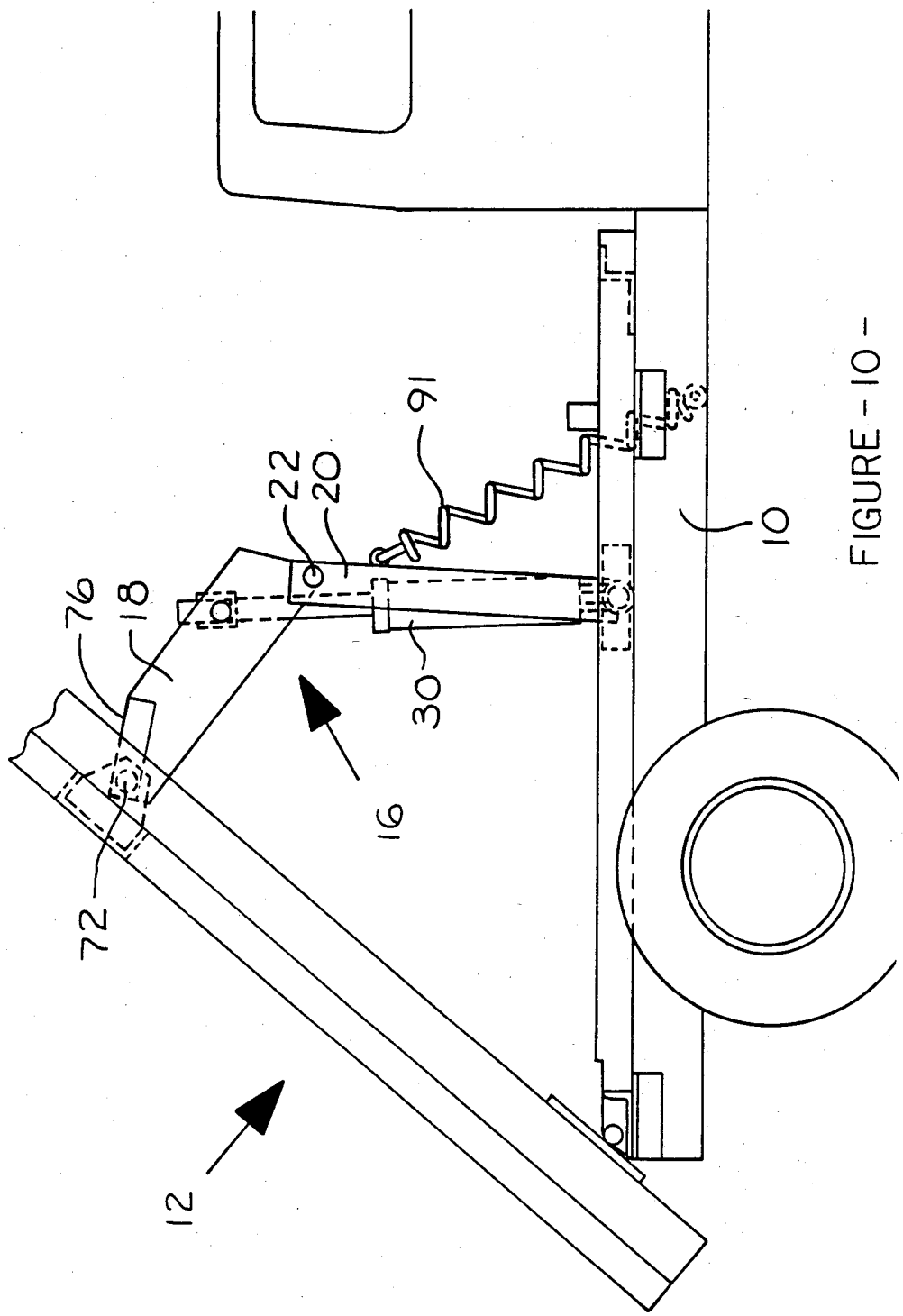
FIGURE -10-

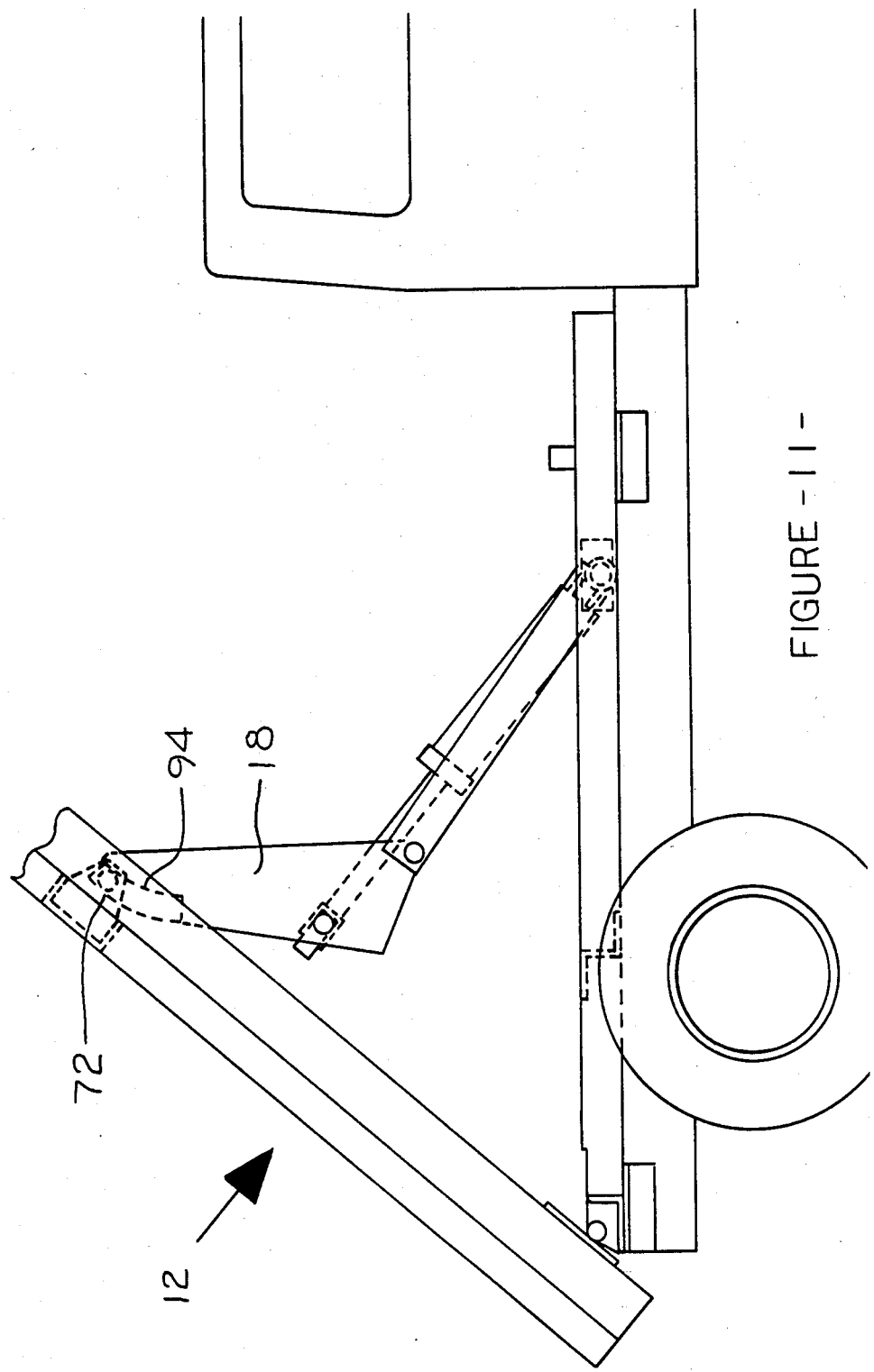
FIGURE-11-

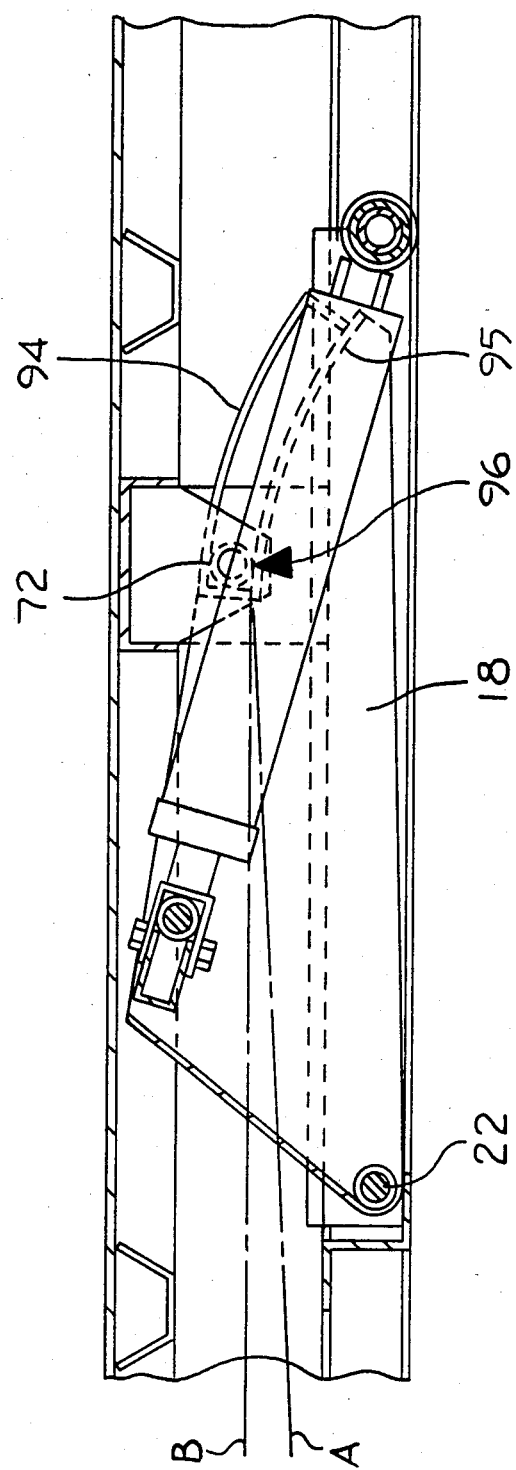
FIGURE -12-

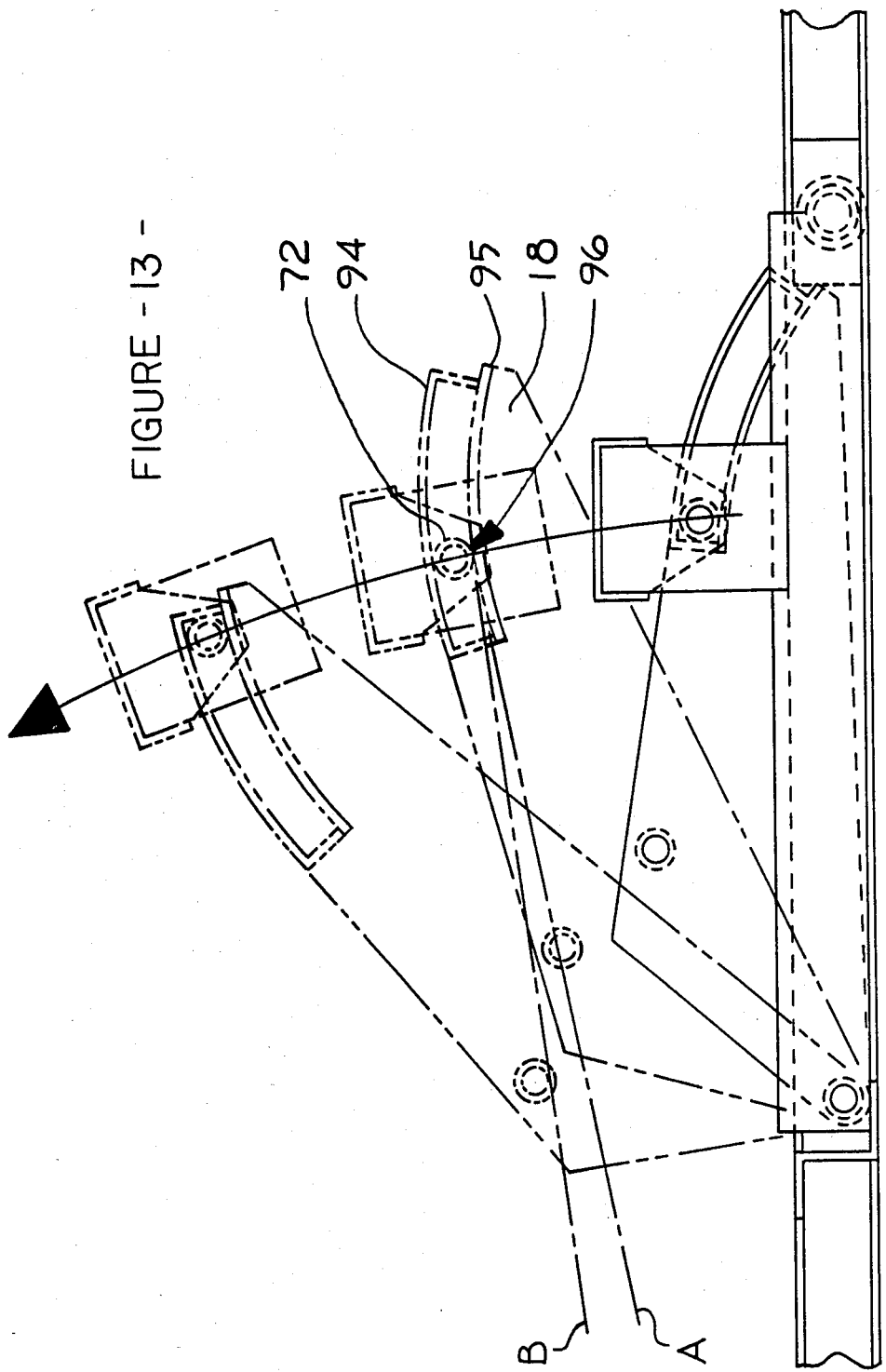
FIGURE - 13 -

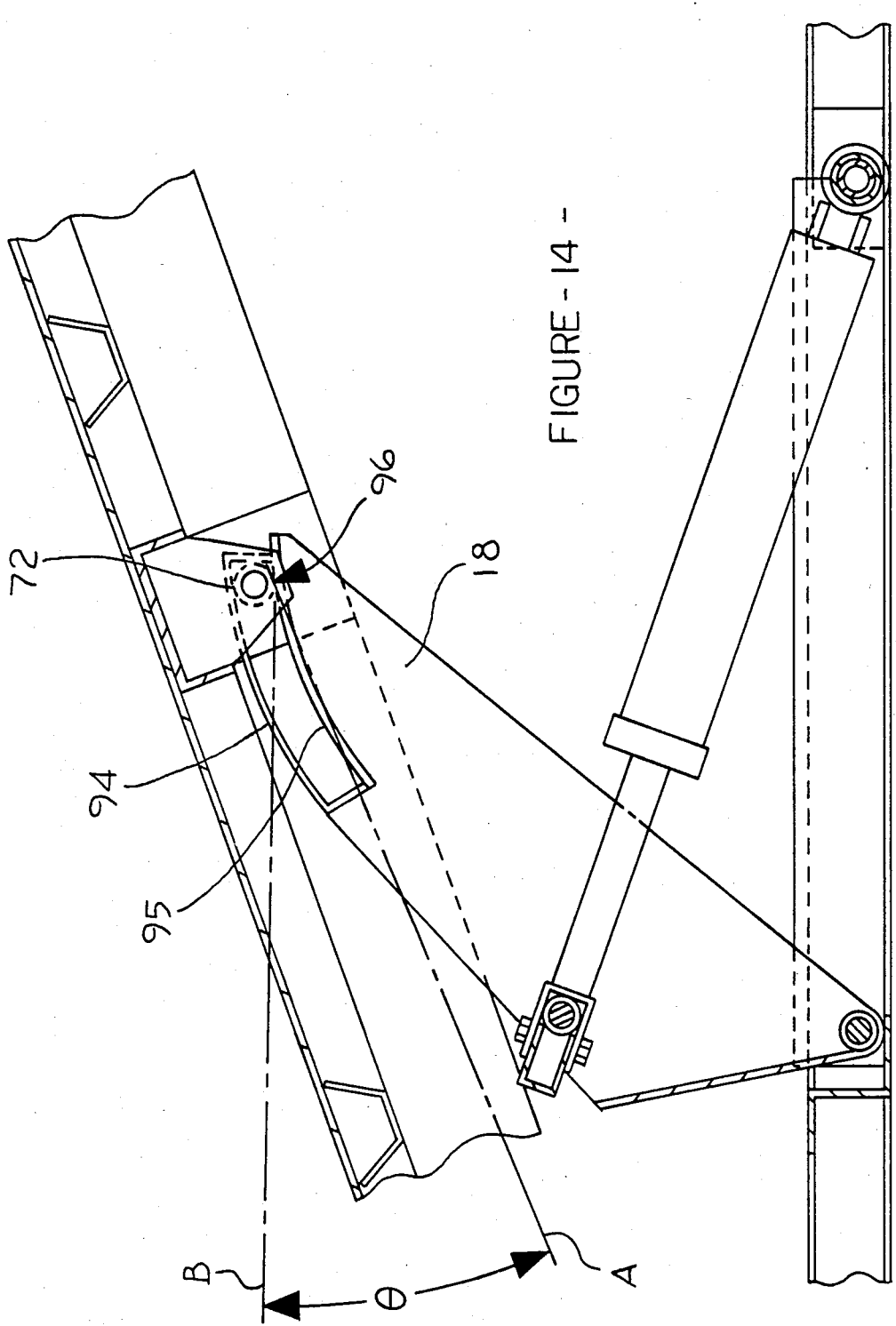
FIGURE - 14 -

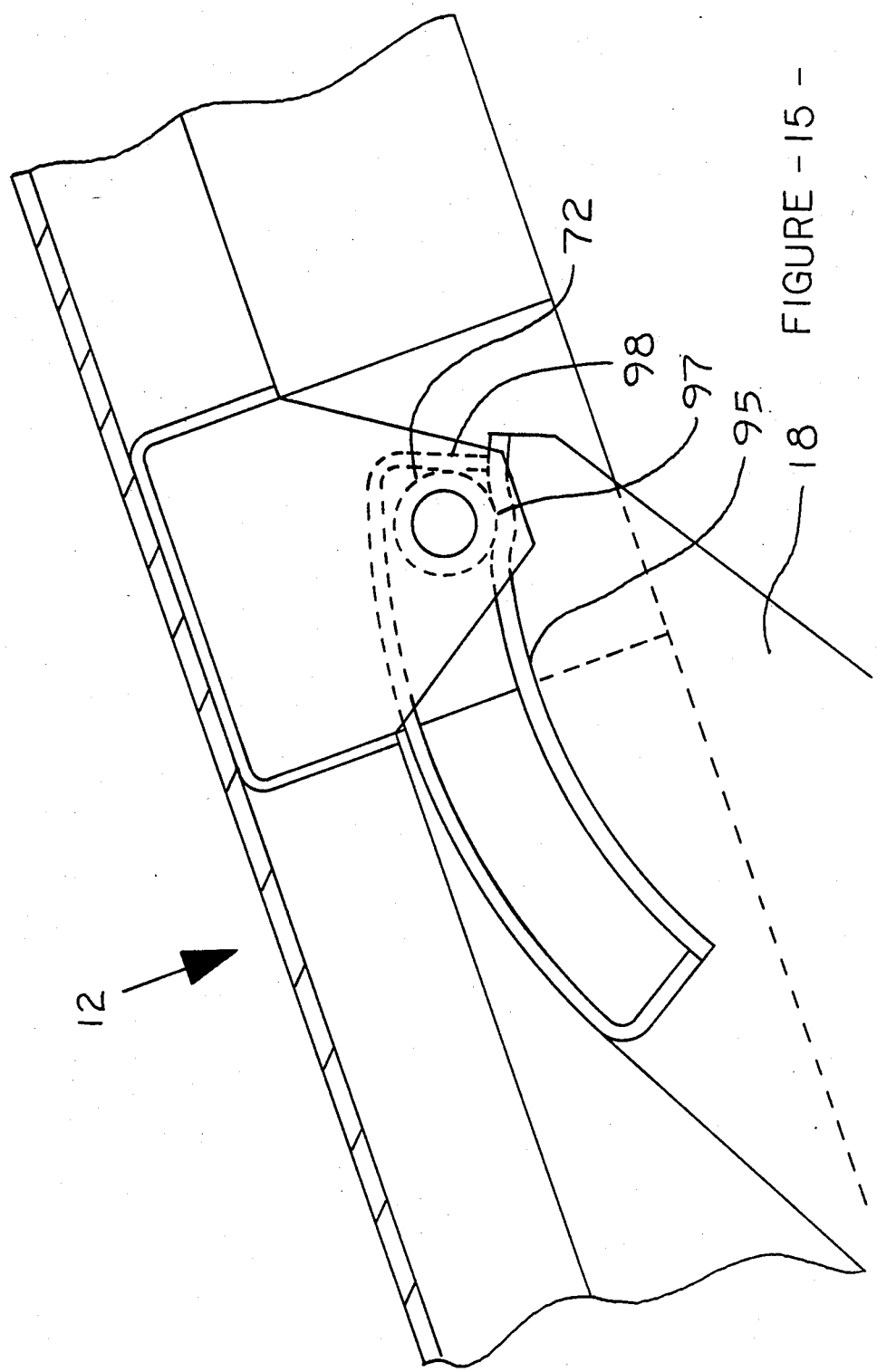

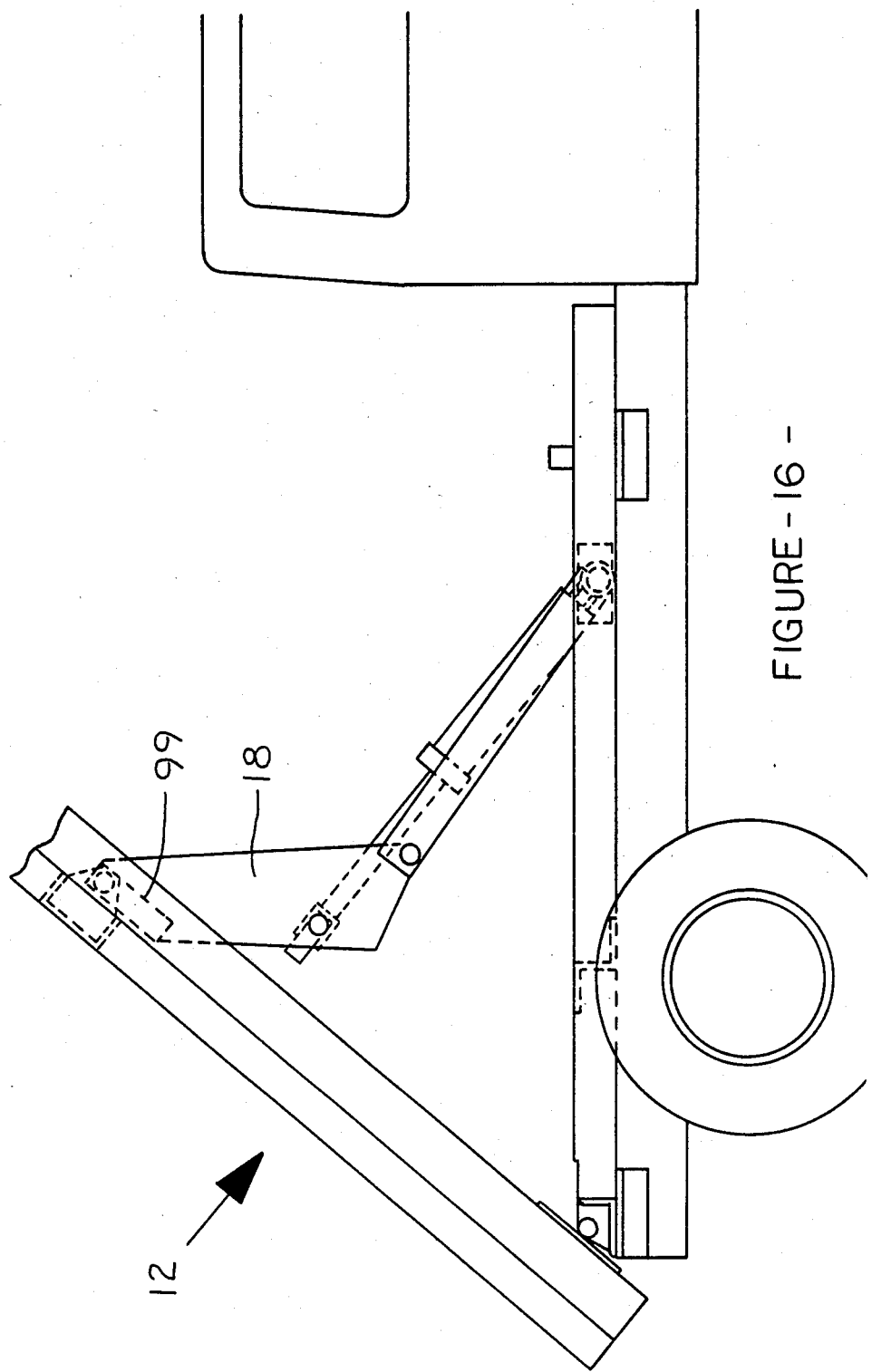
FIGURE - 16 -

DUMP HOIST

RELATED APPLICATION

This is a continuation-in-part of U.S. patent application Ser. No. 571,421, filed Jan. 17, 1984, now abandoned.

TECHNICAL FIELD

This invention relates to hoists for dump trucks and other dumpable vehicles. In particular, this invention provides a hydraulic dump body hoist that uses the hydraulic capacity of the hoist with increased effectiveness.

BACKGROUND ART

Dump trucks and wagons and other dumpable vehicles are widely used throughout industry and on farms and come in a wide variety of types. Generally, they include a dump bed having a dump chassis pivotally connected to a main chassis, usually a subframe or the vehicle chassis, and operated by a hydraulic hoist mechanism extending between the dump chassis and the main chassis. Two of the most popular types of hoists currently used are double-arm hoists and scissors hoists.

An illustrative prior art double arm hoist is shown in FIG. 1A of the accompanying drawings. It includes a vehicle chassis equipped with wheels and tires and with a sub-frame (main chassis) atop the vehicle chassis. A tilted dump chassis is attached by a dump hinge to the rear (left end) of the sub-frame. The remainder of the dump bed is omitted from the figure.

The hoist proper is shown in open or elevated position and has a pair of triangular arms, hence the term "double-arm hoist". These arms have their lower ends attached for pivotal motion about a pivot shaft secured crosswise in the sub-frame, and their upper ends are equipped with rollers adapted to roll in captive relationship in longitudinal channels in the dump chassis longbeams.

The hoist reaches the position shown in the drawing by extension of a hydraulic cylinder connected between a cross-member of the subframe and a cross-shaft joining the mid-portions of the triangular arms. Such extension causes those arms to rotate counter-clockwise about the pivot shaft from a horizontal rest position and to lift on the longbeams as the rollers roll rearwardly in the channels toward the dump hinge. Another example of a double-arm hoist would have pivoted lift links in lieu of the rollers. A wide variety of hoists of these general types have been offered commercially for many years.

FIG. 1B illustrates a prior art scissors hoist in open or elevated position. Here, the tilted dump chassis is directly connected by a dump hinge to the rear of the vehicle chassis.

Included in this hoist are two laterally spaced apart and similar pairs of upper and lower arms located to the left and right sides of the longitudinal center line of the vehicle. One set is hidden behind the other in this right-side view. Both sets normally operate in unison and in the same manner on their respective sides.

Through a main pivot axis at their overlapping ends and through connections at the upper end of the upper arm and at the lower end of the lower arm, respectively, the upper and lower arms in each set are pivotally connected to each other and to the vehicle and dump chassis. The two sets of arms open and close by pivotal scissors motion about their common main pivot axis, which may be a transverse shaft extending between the two sets of arms.

Due to the "L" shape of the arms, the main pivot axis lies well below the elevations of the dump hinge and of the connections between the arms and the respective chassis, when the scissors are closed. Expansion of a hydraulic cylinder located between and connected with both of the sets of scissors arms opens the hoist and tilts the dump chassis.

There is a difference in the arcs travelled by the upper arms and by the portions of the dump chassis to which the arms are attached at the beginning of the dump cycle. Due to the geometry of the arms, this difference could cause binding or straining of the hoist. This difficulty exists only at "breakaway", e.g. during the first few degrees of lifting of the dump chassis (e.g. about 2-3 degrees), which may be alternatively expressed in terms of the percentage of the total stroke of the hydraulic cylinder, e.g. about 5 percent or less, utilized in attaining these few degrees of lift. This arc difference is readily accommodated and the binding/straining problems are readily overcome by connecting the upper arms to the dump chassis through a very short-throw lost motion device discussed in greater detail in U.S. Pat. No. 3,791,695. See also British Patent No. 2,049,566. Substantial numbers of scissors hoists have been sold and utilized commercially.

Each of these types of hoists has its respective advantages as well as its disadvantages. Double-arm hoists generally out-perform scissors hoists in delivering high torque at the breakaway point, i.e. when the dump bed first starts to lift. However, as the dump angle increases, the amount of torque that a double arm hoist can apply to the bed and its payload decreases. Another disadvantage of the double-arm hoist is that it must be located further toward the back of the truck chassis than the scissors hoist in order for its hydraulic cylinder arm to push the truck bed to its maximum dump angle. When the cylinder is near the back of the truck, excessive stress is placed on the rear hinge and hoist operation is less efficient.

A scissors hoist of comparable size has an opposite advantage and disadvantage. For example, a scissors hoist usually provides relatively low torque at the breakaway point. On the other hand, available torque increases as the dump angle increases, up to a certain dump angle. Another advantage of a scissors hoist is that it can be located on the chassis further towards the front of the truck than a double-arm hoist, thus avoiding undue stress on the dump bed pivot connection.

Consideration of the opposite advantages and disadvantages of double-arm hoists and scissors hoists led me to pursue the development of a hoist which would combine the advantages of these two types of hoists while mitigating their disadvantages. My discovery of how to accomplish this objective was disclosed in U.S. Pat. No. 4,302,050 (the '050 patent), issued Nov. 24, 1981 and entitled "TRUCK HOIST".

The hoist of the '050 patent utilizes a pivoting stop means and two rotatable pairs of arms to provide a hoist assembly which acts as a double arm hoist during the initial lifting action, from the time the dump bed lifts off the chassis to the time when the dump bed is at a predetermined "switching angle" with the chassis, and as a scissors hoist during continuation of the lifting action from the switching angle to the uppermost dump angle.

This hoist assembly has a lifting capacity which exceeds that of a double-arm hoist or scissors hoist of comparable size as shown by FIG. 11 of the '050 patent and as discussed therein. Moreover, this hoist assembly has performed superbly in the field.

Competition in the field provides continuing pressure for development of hoists with even greater lifting capacity and hydraulic force efficiency. It is the purpose of this invention to fulfill this need and other needs which will become apparent to the skilled artisan upon becoming familiar with the following disclosure.

SUMMARY OF THE INVENTION

The present invention has many elements in common with the devices shown in the above-mentioned U.S. Pat. No. 3,791,695 (the '695 patent) and in the '050 patent. However, the present invention combines these features with other features not suggested, and in a manner not suggested, by the prior patents. In so doing, the invention obtains valuable improvements in lifting capacity and hydraulic force efficiency.

These new combinations and benefits are provided in the form of dumpable vehicles or sub-frames in combination with hoists, or in the form of hoists which are useful with such vehicles or sub-frames. In common with prior hoists, the instant invention includes, or is useful in connection with, a dumpable vehicle comprising a main chassis, which may be the vehicle (e.g. truck or trailer) chassis, or a subchassis. To the main chassis is connected a dump bed, including a dump chassis tiltable about a dumping axis for supporting and dumping a load borne by the dump bed.

As in the past, the hoist of the present invention is moveable from a rest position to a range of elevated positions in a lift cycle for elevating the dump chassis and includes one or more extensible and retractable hydraulic cylinders. First and second hoist arms (including one or a plurality of each) are connected with the cylinder and with one another for relative pivotal motion about a main pivot axis of said arms. One of these connections, referred to herein as a first connection, pivotally connects the first hoist arm with one of the chassis, and any conventional or suitable pivotal connection may be used. Where plural first arms are present, there may be plural first connections for the respective first arms.

As in prior hoists, the present invention includes a second connection which pivotally connects the second hoist arm with the other chassis, but this connection has certain features which, in combination, make the present hoist unique in its structure and performance. First, contrary to certain of the prior hoists, the second connection is substantially closer to the main pivot axis than the first connection is, at least at the beginning of the lift cycle. Thus, at the beginning of said cycle, the effective length of the second arm is substantially less than that of the first arm. Here again, where there are plural second arms, there may and usually will be plural second connections.

Unlike the hoist of the '050 patent supra, but in common with an embodiment mentioned but not depicted in the '695 patent, the present invention includes a guide means on the second arm and a shiftable member which is borne by the other chassis and capable of relative motion along the length of the guide means during the lift cycle on a path established by the guide means. In common with the '695 patent, the guide means and shiftable member have relatively moveable, mutually engaging surfaces through which forces imposed by the weight of the load are transmitted between the second arm and other chassis. Contrary to the '695 and '050 patents these forces are transmitted, as the lift cycle progresses, at progressively shifting contact zones along an extended path of substantial length defined by the guide means surface. This is accomplished by providing sufficient length in the guide means and in the path traversed by the shiftable member for causing the hoist to operate, during a first portion of the lift cycle, with the first arm at rest and with the second arm in motion and accompanied by gradual relative motion of the shiftable member along the guide means for substantially increasing the effective length of the second arm during the lift cycle until the second arm is at a predetermined switching angle, and to engage, during a second portion of the lift cycle after attainment of the switching angle, in scissors motion about the main pivot axis.

When the guide means and the path traversed by the shiftable member are of sufficient length, the hoist will generate greater lifting capacity and hydraulic force efficiency than would be generated in a double arm hoist or scissors hoist of comparable size. In the alternative, the length of the guide means and its path may be expressed in terms of the extent to which the hydraulic cylinder has extended at the above-mentioned predetermined switching angle. Let us assume that the hydraulic cylinder has a ram whose total stroke during the lifting cycle represents the difference between its extension in the rest position and its extension at maximum dumping elevation of the dump chassis. In such circumstances there is sufficient length in the guide means and of the path traversed by the shiftable member, so that relative motion of the shiftable member along the guide means substantially increases the effective length in the second arm during the lift cycle until the second arm is at a predetermined switching angle corresponding to at least about 10 percent of the total stroke of the hydraulic cylinder.

According to an optional but particularly preferred embodiment, the apparatus of the invention includes preventing means for preventing loads imposed on the second connection by the weight of the dump chassis from shortening the spacing between the main pivot axis and the second connection during at least a portion of the lift cycle. Such preventing means may for example include resilient means connected between the hoist and one of the chassis for opposing such shortening. According to one embodiment the resilient means is a spring which is tensioned as the hoist opens for opposing such shortening. When the first and second hoist arms are lower and upper hoist arms, respectively, the resilient means may be connected between the lower arm of the hoist and the main chassis.

It is particularly preferred that the preventing means include an inclined load-bearing surface of the guide means, and this includes the preferred possibility that the inclined surface alone, or such surface in combination with the weight of the hoist, shall be the sole preventing means. Thus, a load-bearing surface of the guide means may be inclined in such a way, that at any given contact zone along a major portion of the path of the shiftable member, a pair of straight reference lines which extend from the center of the contact zone out of that side of the zone nearest the main pivot axis, with the first line also passing through the dumping axis and with the second line constituting an extension of the guide means load-bearing surface inclination at said center, diverge from one another with the second line being further from the main pivot axis than the first.

Most preferred are those embodiments of the preventing means in which the above-described divergence exists at any given contact zone along substantially the entire length of the shiftable member path. This provides sufficient inclination of the track surface at progressive positions along substantially the entire path for preventing loads imposed on the second connection by the weight of the dump chassis from shortening the spacing between the main pivot axis and the second connection during substantially the entire lift cycle.

While the first and second hoist arms may be connected to the dump and main chassis, respectively, it is preferred that the first and second hoist arms be lower and upper hoist arms, respectively, that the second connection pivotally connect the upper hoist arm with the dump chassis, that the guide means include an elongated track on the upper arm, and that the shiftable member be borne by the dump chassis. Although the guide means and shiftable member may take a variety of forms, such as an elongated rod and slider respectively, it is preferred that the track be a slot formed on (including in) the upper arm and curved throughout substantially its entire length. However, as will be shown below, the track may be a slot which is formed on the upper arm and is straight throughout substantially its entire length.

Although the shiftable member may for example be the end of a cylindrical bar shiftable perpendicular to its axis in the guide means, the shiftable means is preferably a roller held in captive relationship with a track for relative motion therein. In many preferred embodiments the track will be a slot formed on the upper arm and curved throughout substantially its entire length, the shiftable means being a roller held in captive relationship with the slot for relative motion therein, and the end of the slot toward which the roller moves during the lift cycle will constitute a stop means defining the above-mentioned switching angle. Alternatively, in the combination of the preceding sentence, the slot may be straight throughout substantially its entire length. The captive relationship need not rest entirely on the structure of the slot, and may also depend on other structure with which the roller connects or abuts.

From the standpoint of vertical compactness, it is preferred to arrange the hoist so that the dump axis and the main pivot axis are in substantially the same plane with one another when the hoist is in rest position. However, in principle, there is no reason why the main pivot axis may not be located below a horizontal plane containing the dump axis when the hoist is in rest position.

Advantageously, the connection of the hydraulic cylinder with the first and second arms includes a direct connection of the cylinder with one of the arms and an indirect connection of the cylinder with the other of said arms. As an illustration of an indirect connection, the cylinder and the other arm may both be connected to a common pivot shaft, as shown in the drawings discussed below.

It is contemplated that the switching angle may correspond to that position of the hydraulic cylinder in which its longitudinal axis is substantially at a right angle to a reference line drawn through the main hoist pivot axis and through a point of attachment of the cylinder to one of the arms intermediate the first or second connection and the main pivot axis. However, a presently preferred mode of defining the switching angle is in terms of hydraulic cylinder extension. Thus, the switching angle may correspond to extension of the cylinder by an amount in the range of preferably about 10 to about 80 percent, more preferably about 20 to about 75 percent, and most preferably about 40 to about 70 percent of the cylinder's total stroke in the lifting cycle.

For any embodiment of the invention, one may select the value of "L", the effective length of the second arm at the beginning of the lift cycle, so that it is less than about 0.95 and preferably about 0.85 or less of the effective length of the first arm for providing substantial breakaway torque. In such case, the length of the guide means and of the path traversed by the shiftable member are preferably made sufficiently long so that the gradual relative motion of the shiftable member along the guide means will increase the effective length of the second arm to at least about 1.15 L during the lift cycle. Preferably such increase continues until the second arm is at a predetermined switching angle corresponding to about 20 to about 75 percent of the total stroke of the hydraulic cylinder, thereby gradually decreasing the mechanical advantage of the upper arm and increasing the hydraulic efficiency of the hoist. More preferably, L is about 0.7 or less of the effective length of the first arm, and the guide means is sufficiently long to increase the effective length of the second arm to at least about 1.25 L at the switching angle while providing a switching angle in the range of about 40 to about 70 percent of the stroke of the hydraulic cylinder.

The present invention includes within its generic scope, but is not limited to, a particular species of hoist mechanism for use in raising and lowering a dump bed pivotally connected to a vehicle chassis at a chassis-to-bed pivotal connection. This species comprises first and second lifting arms connected at a first pivot point and having a rest position. The first lifting arm has a second pivot point at one end thereof. The first and second pivot points are in substantially the same plane as the chassis-to-bed pivotal connection when the arms are in their rest position. The second lifting arm has an engaging means which includes stop means and is located on one end of the second lifting arm for gradually increasing the effective length of the second lifting arm as the arm is rotated around the first pivot point from the rest position until that arm forms a predetermined angle with respect to the first lifting arm. Also included is an extensible and retractable hydraulic cylinder means for raising and lowering the hoist mechanism, the hydraulic cylinder means being connected to the second lifting arm. This hydraulic cylinder means and the engaging means are so arranged that upon initial extension of the cylinder means, the first lifting arm remains stationary relative to the second pivot point and in its rest position as the second lifting arm rotates around the first pivot point from its rest position until the second lifting arm reaches the predetermined angle with respect to the first lifting arm. The stop means is so located that when the second lifting arm reaches and exceeds the predetermined angle, the stop means causes the first lifting arm to rotate around the second pivot point upon further extension of the hydraulic cylinder means and thereby increase the rate of lifting of the dump bed relative to the amount of cylinder extension.

The above described species includes sub-species in which the engaging means may include a shaft and an elongated track, the elongated track being a part of the second lifting arm. This shaft may be attached to the dump bed and pass through the track such that the movement of the shaft is confined by the track. Since the shaft and track function as a slideable connection between the dump bed and the hoist assembly, they transfer the weight of the dump bed and its payload onto the hoist assembly.

When the dump bed is in the rest position, the shaft can be against the end of the track closest to the first pivot point between the two lifting arms. As the dump bed is initially lifted, the shaft moves relative to the track toward the other end of the track, in proportion to the increase in angle between the two lifting arms. The shaft continues this movement until the second lifting arm reaches the predetermined angle with the first lifting arm. At this point, the shaft will have moved to the stop means, the second end of the track.

In commercial practice, a subframe will frequently be provided for use in mounting the above-described hoist on a vehicle chassis. For example, one may use a sub-frame assembly comprising longitudinal members which prefereably extend above and along substantially the entire length of the vehicle chassis. These provide a convenient mounting for the second pivot point through which the first arm of the hoist may be attached to the sub-frame and through which the hoist may be connected indirectly to the chassis of the truck or other vehicle. It is considered beneficial to position the first pivot point, that which pivotally connects the first and second arms, above or level with the pivotal connection between the dump bed and the vehicle chassis, preferebly being located between the sub-frame longitudinal members when the arms of the hoist are in their down or rest position. Particularly preferred are those arrangements in which the first pivot is located above the vehicle chassis at all times, including when the dump bed or chassis is in its down or rest position and during the initial lifting of the dump bed.

The use of such a sub-frame can make it easier to install hoists, particularly on trucks with frames of varying width. When the hoist assemblies and sub-frames are designed and installed with all of their elements located above the truck chassis, there will be no interference between such elements and other elements of the truck located within or close to the chassis. Also, such an arrangement can contribute to the capacity and efficiency of the hoist assembly.

During the first stage of the operation of the hoist mechanism according to this invention, only the second lifting arm is moving relative to one of the chassis, the first lifting arm remaining stationary relative to that chassis. Also, the effective length of the second lifting arm increases gradually and to a considerable extent as the second lifting arm moves from the rest position to the switching angle. Cooperation of the elongated guide means and shiftable member at the second connection between the hoist and one of the chassis makes possible the above-mentioned substantial increase in the effective length of the second lifting arm. This increase proceeds gradually and preferably continually in proportion or in other relationship to the angle between the first and second lifting arm. Because of these features this invention provides an improved dumpable vehicle hoist with greater lifting capacity and hydraulic force efficiency than prior art hoist assemblies of comparable size.

The truck hoists according to this invention differ from the hoists disclosed in the '050 Patent in that, while the effective length of the second lifting arm is varied in each, this change in the hoists according to U.S. Pat. No. 4,302,050 occurs substantially at one time when the hoist is at the predetermined or switching angle, while in the hoists according to the present invention, this change occurs gradually while the second lifting arm rotates from its rest position to the switching angle.

Gradual increase of the effective length of the second lifting arm gives the hoist assemblies according to the present invention certain significant advantages over the hoists of the '050 Patent. For example, this gradual increase results in a smoother transition between the two stages of operation than the transition from a double arm hoist to a scissors hoist which occurs in the hoist mechanisms according to the '050 patent. This in turn places less stress and strain on the hoist assembly when switching from the first to the second stage of operation, which is highly desirable.

Additional advantages, inhering in at least a majority of the embodiments of the invention, flow from a series of dynamic relationships. First, the proportions of the total weight of the dump chassis which are borne respectively by the hoist and by the dump body hinge change during the lift cycle, with the force exerted on the hoist being at or near its maximum at the commencement of dumping and diminishing substantially and progressively as the dump chassis tilts higher and higher, shifting more and more of its weight to the hinge. Secondly, the moment of the dump chassis and its load about the main pivot axis corresponds with the moment, as distinguished from the effective length, of the second hoist arm. Thirdly, the moment of the hydraulic cylinder about the same axis will ordinarily be less than its maximum when the hoist is at the beginning of the lift cycle, increasing during the first stage of the lift cycle and reaching its maximum at (including near) or before that stage of the lift cycle in which the switching angle is attained. Fourth, the design approach usually taken with respect to the positions of the second arm, second arm to chassis connection, main pivot axis and cylinder to second arm connection in a conventional scissors hoist will lead to gradual decrease of the moment of the second arm, with a corresponding increase in its mechanical advantage vis a vis the load, at the same time that the moment and force exerted by the load are diminishing.

In these circumstances, the available hydraulic power is not being utilized to best advantage. Excessive quantities of hydraulic fluid are being pumped to achieve a given number of degrees of lift. This also occurs to some extent during the latter portion of the first stage of operation of the hoist of the '050 patent. This difficulty can be reduced to a degree by making the second arm longer. However, this will be at the expense of lifting capacity, the force generated by the hoist at "breakaway", when the dump body first begins to tilt, and when the downward force of the loaded dump chassis on the hoist is at or near its maximum.

Because of the comparatively large length of the guide means and of the path traversed by the shiftable member, as compared to what is shown in the '695 patent, the present invention increases the effective length of the second arm during a very substantial portion of the first stage of the lift cycle. Correspondingly, the moment of the second arm is enhanced, i.e. the moment is either increased or its tendency to decrease, if any, is reduced, throughout a substantial portion of the lift cycle after breakaway.

Gradual enhancement of this moment during gradual increase of the cylinder moment and during gradual reduction of the force and moment of the load increases the degree of correspondence between the changing lifting requirements and available lifting force. Thus, the available hydraulic power is used more efficiently. Also, the gains realized in hydraulic efficiency after breakaway make it practical to design hoists whose second arms have relatively short lengths at the beginning of the lift cycle, as compared to the effective lengths of the first arms. In this way, the lifting force at breakaway can be increased while the increasing length and moment enhancement of the second arm after breakaway tend to offset or reduce the hydraulic efficiency penalty that would otherwise accrue from a short second arm of fixed length. Accordingly, the present invention provides gains in lifting capacity and hydraulic force efficiency from structural relationships which are neither taught nor suggested in the '050 and/or '695 patents.

Many of the possible embodiments of the present invention will also be superior to prior hoists, including those of the '050 patent, in having fewer parts and parts which are easier to fabricate. From a manufacturing viewpoint, this reduces the material, equipment and labor costs involved in manufacturing the hoist assemblies.

BRIEF DESCRIPTION OF THE DRAWINGS

FIG. 1A is a perspective view of a prior art double arm hoist in the open position.

FIG. 1B is a side elevation of a prior art scissors hoist having a lost motion device at the connection between its upper arm and the dump chassis.

FIG. 2 is a side elevation of a dumpable vehicle in accordance with the present invention with its dump bed in elevated position.

FIGS. 3 and 4 show the hoist and portions of the main chassis and dump chassis of FIG. 2 in the closed position, FIG. 3 being a top view with the dump bed removed from its chassis, and FIG. 4 being a vertical cross section taken on section line A—A of FIG. 3.

FIG. 5 is similar to FIG. 4, but shows the second arm of the hoist in three positions, including its rest position, its position at the switching angle and one intermediate position, the dump bed and its chassis being omitted with the exception of those parts forming the connection between the second arm and the dump chassis.

FIG. 6 is a sectional view similar to a portion of FIG. 4, in which the second arm is shown in its switching angle position along with additional portions of the dump bed and chassis that were omitted from FIG. 5.

FIG. 7 is a sectional view similar to FIG. 6, but showing the hoist more fully extended, i.e. beyond the switching angle and approaching its maximum elevation.

FIG. 8 is similar to FIG. 2, except that the hoist has been turned around so that the end of the hoist which includes the main pivot axis extends away from rather than toward the dumping axis.

FIG. 9 is similar to FIG. 2 and additionally includes illustrative preventing means for preventing loads imposed on the second connection of the hoist from shortening the spacing between that connection and the main pivot axis.

FIG. 10 shows a preventing means similar to that of FIG. 9 applied to the hoist configuration of FIG. 8.

FIG. 11 is similar to FIGS. 2 and 9, showing an alternative form of preventing means which in this case is an inclined load bearing surface of a curved slot formed on the second arm of the hoist and constituting part of a second connection between that arm and the dump chassis.

FIG. 12 is a sectional view similar to FIG. 4, except that the curved slot of FIG. 11 has been substituted.

FIG. 13 is a sectional view similar to FIG. 12, but shows the combination of the second arm, curved slot, shiftable member and a portion of the dump chassis progressing from rest position through an intermediate position to the switching angle.

FIG. 14 is a sectional view similar to that portion of FIG. 13 which shows the parts at the switching angle, and additionally shows portions of the dump bed and chassis which have been omitted from FIG. 13.

FIG. 15 is an enlargement of the outer end of the second arm and its slot along with a portion of the chassis, all in a position similar to that shown in FIG. 14, but with the optional addition of a detent in the slot.

FIG. 16 is similar to FIG. 11 in showing a dumpable vehicle with a hoist in which the guide means includes an elongated track which acts as a preventing means, located on the second arm of the hoist, but in this case the track is straight.

DETAILED DESCRIPTION OF THE DRAWINGS

Referring to the accompanying drawings, and in particular to a first embodiment of the invention, FIGS. 2–7 illustrate a typical truck chassis 10 and a dump bed 12 hinged together at the back of the truck by hinge 14. Hinge 14 therefore includes the dumping axis for dump bed 12. Dump bed 12 comprises floor 52 and a dump chassis comprising body longbeams 48 and crossmember 50.

Inserted between chassis 10 and dump bed 12 are subframe assembly 80 and hoist assembly 16, portions of which appear in FIGS. 2, 3 and 4. Subframe assembly 80 is comprised of longitudinal beams 82, cross beam 84 and chassis brackets 86. Subframe assembly 80, in this embodiment, is designed and arranged such that longitudinal beams 82 and cross beam 84 rest on top of chassis 10 and such that chassis brackets 86 extend down along the outside of chassis 10, two on each side, and are attached to chassis 10. Longitudinal beams 82 are placed such that both have one end proximate to the back of the truck cab and extend almost the entire length of the truck chassis 10. Cross beam 84 extends between and is connected to the longitudinal beams 82. Together, the vehicle chassis 10 and sub-frame assembly 80 constitute the main chassis of this embodiment.

Subframe assembly 80 also includes dump bed positioner flanges 88 which are attached to and extend up from longitudinal beams 82 at an angle of approximately 30° with the edges of longitudinal beams 82. Flanges 88 act to guide dump bed 12 to its lowermost position, resting on subframe 80.

Hoist assembly 16 has two pairs of arms, lower arms 20, which may be the first arms in certain embodiments, and upper arms 18, which may be the second arms. These arms are rotatable with respect to each other. Upper arms plate 19, visible in FIG. 3, is attached to the ends of upper arms 18 so that upper arms 18 move simultaneously. In the present embodiment of this invention, upper arms 18 are located inside lower arms 20. Upper arms 18 and lower arms 20 are hinged together by arms pivoting crosstube 22, which represents or includes the main pivot axis. Therefore, arm pivoting crosstube 22 represents the pivot point for upper arms 18 when they rotate with respect to lower arms 20.

Hoist assembly 16 is rotatably connected to subframe assembly 80 by subframe brackets 24 and subframe pivoting crosstube 26 shown in FIGS. 3 and 4. Subframe pivoting crosstube 26 passes through lower arms 20 and subframe bracket 24 and extends between longitudinal beams 82. Thus, subframe pivoting crosstube 26 represents a first connection of hoist arms to one of the chassis and in this embodiment constitutes the pivoting point for lower arms 20 when they rotate with respect to subframe 80.

In other embodiments, subframe assembly 80 is omitted in its entirety such that hoist assembly 16 can be directly connected to vehicle chassis 10. In these embodiments, pivoting crosstube 26 is attached directly to chassis 10, instead of being attached to subframe assembly 80.

In the embodiment illustrated in FIGS. 2–7, lower arms 20 are straight elongated hollow bars having a rectangular cross section. Lower arms 20 can be designed and located such that they do not extend below subframe assembly 80 when hoist assembly 16 is in the down position. Likewise, upper arms 18 can be designed with a straight bottom edge such that upper arms 18 do not extend below subframe assembly 80. Thus, in the embodiment illustrated in FIGS. 2–7, no element of subframe assembly 80 or hoist assembly 16 extends below the top of chassis 10. This capability is valuable since not all trucks having dump beds have room within or below the chassis for a hoist assembly 16. This design of hoist assembly and subframe assembly 80 solves this problem. However, in some embodiments of the invention, rear hinge pivot 14 and/or main pivot axis 22 may be located below the top of chassis 10.

Hoist assembly 16 also has an extendible and retractable hydraulic cylinder 30 of a known type such as are commonly employed in conventional scissors hoists. Hydraulic cylinder 30 has one of its ends rotatably attached to subframe pivoting crosstube 26, and its other end has a protruding extendible rod or ram 32. Crosshead member 34 is attached to ram 32 and is rotatably attached to upper arms 18 by crosshead pivoting crosstube 36.

As is best shown in FIGS. 3 and 4, crosshead member 34 is made up of plate 54, plate 56, bracing members 60, 61, 62, 63 and 64, and screws 58. Plates 54 and 56 are of a U-shaped cross-section and are fastened together by screws 58 such than an open-ended box with four walls is formed by plates 54 and 56. The surface of plate 54 at the bottom of the U is fixedly attached in this embodiment, by welding, to extendible rod 32. Bracing members 60, 61, 62, 63 and 64 are located inside plates 54 and 56 and run from the bottom wall of the U of plate 56 to crosshead pivoting crosstube 36. Crosshead member 34 has the function of distributing the force to be applied by extendible rod 32 evenly over the length of crosstube 36 so that crosstube 36 has a higher resistance to bending forces.

Upper arms 18 are attached to the dump chassis of dump bed 12 by a guide means and shiftable member which in this embodiment are an engaging means comprised of shafts 70, rollers 72, lift brackets 74 and tracks 76. Lift brackets 74 are attached to channels 78 which are in turn attached to the underside of the dump chassis. There is a lift bracket 74 located on each side of the two upper arms 18, thus comprising two pairs of lift brackets.

Shafts 70 extend between each pair of lift brackets 74 and are welded on the ends to the outer lift brackets 74. Rollers 72 circumferentially surround the portions of shafts 70 which are between each pair of brackets 74.

Tracks 76 are elongated slots or loops formed by a metal flange extending perpendicularly, to the side surfaces of upper arms 18. The engaging means and upper arms 18 are designed and located such that each upper arm 18 is located between a pair of lift brackets 74 and encompasses a roller 72. Thus shafts 70 and rollers 72 extend through tracks 76 when hoist assembly 16 is properly assembled on a dump truck such that the movement of shafts 70 relative to tracks 76 is limited to the length of tracks 76.

This embodiment of the invention, as illustrated in FIGS. 4–7, operates as follows. When dump bed 12 is in the down or rest position, the hoist assembly profile is as shown by FIG. 4, with lower arms 20 resting on subframe cross beam 84 and body long beams 48 resting on longitudinal beams 82 of subframe 80. Also, hydraulic cylinder 30 is in its non-extended position and shafts 70 and rollers 72 are located against the left edges of tracks 76 (as shown in FIG. 2). However the track length can be greater, and it is not essential that rollers 72 rest against the ends of the tracks.

To commence the lift cycle and elevate dump bed 12 to its dumping position, hydraulic cylinder 30 is initially activated and exerts enough pressure through extendible rod or ram 32 and upper arms 18 to effect breakaway of chassis 10. Ram 32 pushes on upper arms 18 at crosshead pivoting crosstube 36, causing upper arms 18 to rotate upwards around their main pivot axis, arm pivoting crosstube 22. During this initial lifting of dump bed 12, lower arms 20 remain stationary in the down position as shown in FIG. 4. Also, hydraulic cylinder 30, due to the rotation of upper arms 18, rotates around subframe pivoting crosstube 26, while dump bed 12 rotates about its dumping axis, rear hinge 14.

As soon as upper arms 18 lift off of chassis 10, shafts 70 and rollers 72 begin moving relative to track 76 from their inner edges (the left edges of tracks 76 in FIG. 4 and in the lowest position shown in FIG. 5) toward their outer edges (the track right edges in FIGS. 4 and 5). As upper arms 18 continue to rotate around arm pivoting crosstube 22, shafts 70 and rollers 72 continue to gradually move relative to tracks 76 passing outward and through the intermediate position shown in FIG. 5. In some embodiments of this invention, rollers 72 move relative to tracks 76 in direct proportion to the angle between upper lifting arms 18 and lower lifting arms 20. Further and continuing upward motion of arms 18 causes shafts 70 and rollers 72 to progress to the outer edges of tracks 76, the uppermost position shown in FIG. 5, where upper arms 18 have reached the switching angle. During the first portion of the lift cycle (until the switching angle has been reached), only upper arms 18 are in motion for pushing dump bed 12 upward, while the length of upper arms 18 is gradually increasing as the dump bed rises. Because the effective length of upper arms 18 was the shortest when the dump bed was at the beginning of the lift cycle, hoist assembly 16 has the advantage of a relatively high breakaway torque, but gradual increase of the effective length of the upper arms prior to attainment of the switching angle offsets at least part of the hydraulic efficiency penalty which would have otherwise resulted from a short upper arm of fixed length.

The moment arms of hoist assembly 16 as upper arms 18 are swung from the down position to the switching angle are as follows. The moment arm for the hydraulic force corresponds to the length of a line between and perpendicular to (1) a line running along the longitudinal axis of hydraulic cylinder 30 and (2) a line parallel to line (1) which runs through the axis of rotation of pivoting crosstube 22, i.e. the main pivot axis. The moment arm for the weight force exerted by the truck bed and its payload relative to the hoist is the horizontal distance between (1) a first line perpendicular to the track surface at the center of the contact zone between the load-bearing surface of either of tracks 76 and the mutually engaging load-bearing surface of one of the rollers 72 and (2) a second line, parallel to the first, passing through the main pivot axis, i.e. the rotational axis of pivoting crosstube 22. In the present embodiment, the moment of the load relative to the hoist is gradually and continuously enhanced as upper arms 18 rotate from the down position to the switching angle. The moment arm of the dump bed and its load about the dumping axis is the distance between (1) a first line perpendicular to the track surface at the center of the contact zone between the load-bearing surface of either of the tracks 76 and the mutually engaging load-bearing surface of one of the rollers 72 (the same line (1) referred to in the second preceding sentence) and (2) a second line parallel to the first, passing through the dumping axis, i.e. through dump hinge 14. Changes in the relationships of these moments results in advantages which have already been discussed.

The "switching angle", at which the mode of the lifting action of the hoist assembly 16 switches to that of a scissors type hoist, may vary depending on the type of hoist configuration and size. This angle may be chosen to be that angle at which the scissors type hoist has heretofore been considered to be most efficient, which would be at the point where a line drawn from arm pivoting crosstube 22 to crosshead pivoting crosstube 36 is at 90° to the longitudinal axis of hydraulic cylinder 30. This has heretofore been considered to be the optimum "switching angle" for some of the earlier embodiments of the invention. Typically, this angle would be about 20° (i.e., chassis to bed angle), although larger switching angles are now considered best as will be explained in connection with certain preferred embodiments discussed below.

When hydraulic cylinder 30 extends far enough to push dump bed 12 beyond the switching angle, upper arms 18 continue to rotate around arm pivoting crosstubes 22 with respect to lower arms 20, and lower arms 20 rotate around subframe pivoting crosstube 26. During the movement, hydraulic cylinder 30 continues to rotate around subframe pivoting crosstube 26. The elements continue this movement, which is similar to the lifting action of a scissors hoist, until the maximum desired dump angle is reached, as shown in FIG. 7. During this motion, the moment of the hoist is a distance between (1) a first line passing through the axes of pivoting cross-tube 26 and shafts 70 and (2) a second line, parallel to the first, passing through the main pivot axis, i.e. main pivoting cross-tube 22.

During the scissors mode operation of hoist assembly 16 above the "switching angle", available torque increases as the dump angle increases. Therefore, this new hoist design has the advantages of two prior art hoists described above (double arm and scissors) while mitigating, to the extent desired, their disadvantages. Moreover, when the new hoist assembly is located further towards the front of the chassis than a similar sized double-arm hoist usually is, the stress on the rear hinge during operation of the new hoist assembly is lower than that normally experienced with a double-arm hoist.

Another embodiment within the scope of this invention is illustrated in FIG. 8. Note that in this embodiment, extendible rod 32 points toward the front instead of the back of the truck, and that hydraulic cylinder 30 rotates clockwise, not counterclockwise. The relative movement of the other elements of hoist assembly 16 is the same as in the embodiment described above except that the rotational directions are reversed.

In other embodiments, hoist assembly 16 can be turned upside down such that hydraulic cylinder 30 would be rotatably attached to dump bed 12 and shaft 70 would be attached to subframe assembly 80. Also, more than one hydraulic cylinder may be used for added lifting power. Furthermore, the hydraulic cylinder(s) could be rotatably attached to the dump bed or the chassis by means independent of the other elements of the hoist assembly.

The switching angle can be varied by varying any one of a number of elements of the embodiment illustrated in the Figures. For example, tracks 76 could be lengthened, the angle of tracks 76 to a line connecting tubes 22 and 36 could be altered, pivot tube 36 could be relocated with respect to upper arms 18, and so forth.

During experimentation with prototypes of the invention having first and second arms 20 and 18 and angled tracks 76 corresponding to the proportions shown in FIGS. 2 through 8, it has been found that under certain conditions, such as when the hoist mechanism is not sufficiently heavy or when the load on the dump chassis is sufficiently great, the rollers 72 may not remain at the outer ends of tracks 76 throughout the second portion of the lift cycle. Rather, the rollers may, after initially contacting the outer ends of the tracks, begin to draw back toward the main pivoting crosstube 22 as the dump chassis approaches maximum elevation. In order that the hoist may be commercially acceptable under the above-described conditions, it is believed that the rollers should remain at the outer ends of the tracks throughout the second portion of the lift cycle, i.e. after the switching angle has been attained. Attainment of this objective will avoid the possibility of instability in the hoist and obviate the need for providing extra clearance between the dump body and the hoist, which might otherwise be required to prevent binding of the hoist against the under portion of the dump body during extreme regression of the rollers 22. In this connection, it has been found that the operation of the above-described hoists can be significantly improved if they are provided with preventing means for preventing loads imposed by the weight of the dump chassis from shortening the spacing between the main pivot axis and the second connection or connections, especially during the second portion of the lift cycle. The preventing means may take a variety of forms which can be illustrated with the aid of FIGS. 9–16, described below.

FIG. 9 discloses a dump truck which is generally similar to the one shown in FIG. 2. It includes the same truck chassis 10, dump bed 12 and hoist mechanism 16 having, among other parts, the previously described hydraulic cylinder 30, lower and upper arms 20 and 18 and track-roller combinations 76–72. In this embodiment the preventing means is a coil spring 90 connected between chassis 10 and lower arms 20 in such a position that it is tensioned by the lifting of lower arms 20. The resultant tension is transmitted through pivoting cross tube 22 to the upper arms 18, thereby exerting a downward pull on arms 18 and slots 76 and tending to retain rollers 72 at the outermost ends of slots 76, i.e. at the ends furtherest from the main pivot axis or crosstube 22.

FIG. 10 shows that the same principle may be applied to the main chassis/hoist mechanism/dump chassis combination of FIG. 8, in which the hoist has been turned around so that its pivoting crosstube 22 is towards the front of the truck when the hoist mechanism is in its rest position. FIG. 10 shows the hoist mechanism 16 in its fully elevated position with hydraulic cylinder 30 fully extended and with upper and lower arms 18 and 20 open to their maximum angle. Coil spring 91, connected between vehicle chassis 10 and lower arms 20, exerts a downward pull on upper arms 18 through pivoting crosstube 22 thereby retaining rollers 72 at the outermost ends of tracks 76 and maintaining dump bed 12 in a stable condition.

However, it has now been discovered that the preventing means may be one or more appropriately inclined load bearing surfaces of the guide means, e.g. a modified form or forms of the tracks 76. These modified forms of guide means may, if desired, be used with the same vehicle chassis, dump hinges, first hoist arms, hydraulic cylinders and other hoist components that have previously been described in connection with FIGS. 2-8. For purposes of convenient illustration and not limitation, the dump chassis, dump hinge, dump bed, lower hoist arms, hydraulic cylinders and other components used in the FIGS. 11-16 embodiments are the same as those used in FIGS. 2-8, and will not be further discussed herein except as may be necessary to an understanding of the structure and operation of the modified guide means.

FIG. 11 is similar to FIG. 2 in all respects except for the shape of the guide means which in this case is a pair of curved tracks, e.g. slots 94, formed in the outer ends of a pair of second or upper hoist arms 18. As in the prior embodiments, rollers 72 constitute the shiftable members and they are held in captive relationship with the tracks 94 for supporting the dump chassis 12 through shafts 70 (not shown).

FIG. 12 provides an enlarged side view, partially in section, of the hoist of FIG. 11, the hoist being shown in its down or at rest position along with portions of the connected vehicle and dump chassis. The parts in this view are the same as those described in FIG. 4, with the exception of the curved track 94 and the outermost portion of upper arm 18 which supports this track. The top view of this hoist mechanism will be similar to FIG. 3.

As a group, FIGS. 12-14 are similar to FIGS. 4-6 respectively, with the exception of the presence of the curved track 94 and such modifications of the shape of second or upper arm 18 as may be required to accommodate the curved shape of the track. These Figures illustrate a load bearing surface of a guide means which is inclined in such a way that at any given contact zone along a major portion of the path of the shiftable member, a pair of straight reference lines which extend from the center of the contact zone out of that side of the zone nearest the main pivot axis, with the first line also passing through the dumping axis and with the second line constituting an extension of the guide means load-bearing surface inclination at said center, diverge from one another with the second line being further from the main pivot axis than the first. These figures also illustrate the preferred form of the invention in which such divergence exists at any given contact zone between the guide means and shiftable member along substantially the entire length of the shiftable member's path. This provides sufficient inclination of the track surface at progressive positions along substantially the entire path for preventing loads imposed on the second connection by the weight of the dump chassis from shortening the spacing between the main pivot axis and the second connection during substantially the entire lift cycle. FIGS. 12-14 show the hoist mechanism in its rest position (FIG. 12); in a three position view including the rest position, an intermediate position and the switching angle (FIG. 13); and at the switching angle (FIG. 14). The above-described reference lines have been applied to FIGS. 12-14 to show the positions which such reference lines will occupy in the present embodiment when the hoist mechanism is in the at rest, intermediate and switching angle positions.

Turning now to FIG. 12, it will be seen that the guide members, curved tracks 94, have load-bearing surfaces 95 which are in mutual engagement with shiftable members, in this case rollers 72 which are similar to the rollers 72 attached to the dump chassis in the prior embodiments. It will be appreciated that the guide means and shiftable members may take a variety of forms as indicated above, and that there will be a contact zone where their mutually engaging load-bearing surfaces are in contact with one another. In this instance, the contact zones 96 are those portions of load-bearing surfaces 95 which are in contact with whichever portions of rollers 72 are facing the surfaces 95 at any given time. It will of course be appreciated that the locations of the contact zones will shift along surfaces 95 as the rollers and tracks move relative to one another during elevation of arms 18. Irrespective of whether the guide means and shiftable members have relatively narrow contact zones, such as will be the case when using curved tracks and rollers, or relatively wider contact zones, such as when using curved bars and sliders in combination, the contact zones will have centers which are used for defining the positions of pairs of reference lines which in turn define the contours of the guide means load bearing surfaces 95.

The above-mentioned reference lines extend from the centers of contact zones 95 out of the side of each zone nearest the rest position of the shiftable member and the main pivot axis, which in this case is the pivoting crosstube 22. In this embodiment, the side of the contact zone from which the reference lines extend is also the side nearest the dumping axis, but the side furtherest from the dumping axis would be used if the hoist were turned around in the manner shown in FIG. 10. In FIG. 12, the first line, line A, passes through the vehicle dumping axis, (not shown) which corresponds to the dump hinge 14 shown in FIG. 2. The second line constitutes an extension of the inclination of one of the guide means load-bearing surfaces at the above-mentioned center. Thus, if the guide means load-bearing surfaces 95 have uniform radii, which is preferred but not required, reference line B will be tangent to one of the surfaces 95 at the center of the contact zone. The first line A, diverges from the second line, B, with B being further from the main pivot axis than A.

FIGS. 13 and 14 show how the above-described relationship continues to apply in the intermediate position of the hoist as shown in FIG. 13 and at the switching angle, as shown at FIG. 14. Note that the divergence increases substantially as the hoist approaches the switching angle, as illusted by angle Theta in FIG. 14. The hoist of FIG. 14 is intended to continue elevating to a maximum elevation similar to that shown in FIG. 7, such further elevation representing the second portion of the lift cycle. During this second portion of the lift cycle, owing to the positions of the dump axis and the hoist, and the fact that the distance between the dump axis and rollers 72 is substantially longer than the effective length of the arms 18, the angle Theta will diminish as the hoist continues from the FIG. 14 position toward its maximum elevation. Thus, it is desirable to provide an enlarged angle Theta at the switching angle in those embodiments where the above-described divergence must be maintained until the hoist reaches maximum elevation.

Heretofore it has been considered best to design the proportions of the hoist so that the switching angle will occur when the moment of the hydraulic cylinder is about at its maximum and preferably at a dumping angle (angle of main chassis to dump chassis) of about 20°. However, in the curved slot embodiment depicted in FIGS. 11-15 it is preferred to predetermine the switching angle so that at the switching angle the cylinder moment has already approached and passed its maximum, leading to a somewhat larger switching angle, e.g. about 25°. In current prototypes, the proportions are such that maximum hydraulic cylinder moment occurs at about 33 percent of total ram stroke while the switching angle occurs at about 58 percent of total ram stroke. A cylinder stroke of 58 percent corresponds with about 33 percent elongation of the second arm in these prototypes. It is considered that in some circumstances this may not be the ideal switching angle, because it may cause the power requirement to decrease faster than the decrease in horse power that occurs beyond the maximum cylinder moment. In any event, those of ordinary skill in the art, having the benefit of the present disclosure, will readily design hoists embodying the optimum or desired degree of equivalence between available hoist power and power requirements.

As shown in FIG. 15, it has been found beneficial to provide an auxiliary holding means at the outer end of the guide means, i.e. that end of the guide means which is furthest from the main pivot axis. This will help maintain the dump chassis in a stable condition if the operator rocks the vehicle with short, jerky, fore and aft motions while the dump chassis is between the switching angle and its maximum elevation. This is illustrated by FIG. 15 which shows a portion of dump bed 12 and one of the second or upper arms 18 at substantially the same elevation as is depicted in FIG. 14. In this embodiment, each of the track load-bearing surfaces 95 has as its holding means a detent or shallow depression 97 conforming generally or at least approximately to the curvature of rollers 72 and located adjacent the outer ends 98 of the tracks.

Although the illustrative curved track in FIGS. 11-14 represents the most preferred embodiment of the guide means for the present invention, such guide means may have a load bearing surface which is substantially straight through the major portion or substantially all of its length. This is illustrated in FIG. 16 which shows one of two tracks 99. If this Figure were provided with reference lines conforming to the description of reference lines A and B of FIGS. 12-14, it would be seen that tracks 99 also maintain the above-described divergence throughout the dump cycle. One of the reasons for preferring the curved track configuration of FIGS. 11-14 is that the FIG. 16 embodiment will require additional overhead clearance between the upper hoist arm 18 and the underside of dump bed 12.

Wherever this disclosure and the accompanying claims refer to a single item such as a hydraulic cylinder, first or second hoist arm or pivotal connection between such an arm and a chassis, such reference should be understood to include the possible presence of one or of two or more of each or any of these items in the described or claimed combination.

Many other features, modifications, and improvements will become apparent to the skilled artisan upon consideration of the foregoing disclosure. Such other features, modifications and improvements are therefore considered to be a part of this invention, the scope of which is to be determined by the following claims.

I claim:

1. A dumpable vehicle comprising:
   I. a main chassis,
   II. a dump bed including a dump chassis tiltable about a dumping axis for supporting and dumping a load borne by the dump bed, and
   III. A hoist moveable from a rest position to a range of elevated positions in a lift cycle for elevating the dump chassis, which hoist includes:
      A. an extensible and retractable hydraulic cylinder,
      B. first and second hoist arms which are connected with said cylinder and with one another for relative pivotal motion about a main pivot axis of said arms,
      C. a first connection which pivotally connects the first hoist arm with one of the chassis, and
      D. a second connection which
         1. pivotally connects the seconds hoist arm with the other chassis,
         2. is substantially closer to the main pivot axis than the first connection is, at the beginning of the lift cycle, so that the effective length of the second arm at the beginning of said cycle is substantially less than that of the first arm,
         3. includes a guide means on the second arm and a shiftable member which is
            a. borne by the other chassis and
            b. capable of relative motion along the length of the guide means during the lift cycle on a path established by the guide means,
         said guide means and shiftable member having relatively moveable, mutually engaging surfaces through which forces imposed by the weight of the load are transmitted between the second arm and other chassis at progressively shifting contact zones along the guide means surfaces as the lift cycle progresses, and
         4. includes sufficient length in the guide means and in the path traversed by the shiftable member for causing the hoist:
            a. to operate, during a first portion of the lift cycle, with the first arm at rest and with the second arm in motion and accompanied by gradual relative motion of said shiftable member along said guide means for substantially increasing the effective length of the second arm during the lift cycle until the second arm is at a predetermined switching angle, and b. to engage, during a second portion of the lift cycle after attainment of the switching angle, in scissors motion about the main pivot axis.

2. A dump hoist useful in vehicles including a main chassis and a dump bed having a dump chassis tiltable about a dumping axis for supporting and dumping a load borne by the dump bed, said hoist being moveable from a rest position to a range of elevated positions in a lift cycle for elevating the dump chassis and comprising:

A. an extensible and retractable hydraulic cylinder,

B. first and second hoist arms which are connected with said cylinder and with one another for relative pivotable motion about a main pivot axis of said arms, C. a first connection for pivotally connecting the first hoist arm with one of the chassis, and D. a second connection for pivotally connecting the second hoist arm with the other chassis and which:
  1. is substantially closer to the main pivot axis than the first connection is, at the beginning of the lift cycle, so that the effective length of the second arm at the beginning of said cycle is substantially less than that of the first arm,
  2. includes a guide means on the second arm and a shiftable member which is
    a. for attachment to the other chassis and
    b. capable of relative motion along the length of the guide means during the lift cycle on a path established by the guide means,
  said guide means and shiftable member having relatively moveable, mutually engaging surfaces through which force imposed by the weight of the load may be transmitted between the second arm and other chassis at progressively shifting contact zones along the guide means surface as the lift cycle progresses, and
  4. includes sufficient length in the guide means and in the path traversed by the shiftable member for causing the hoist:
    a. to operate, during a first portion of the lift cycle, with the first arm at rest and with the second arm in motion and accompanied by gradual relative motion of said shiftable member along said guide means for substantially increasing the effective length of the second arm during the lift cycle until the second arm is at a predetermined switching angle, and
    b. to engage, during a second portion of the lift cycle after attainment of the switching angle, in scissors motion about the main hoist pivot axis.

3. A dumpable vehicle comprising:

I. a main chassis,

II. a dump bed including a dump chassis tiltable about a dumping axis for supporting and dumping a load borne by the dump bed, and III. a hoist movable from a rest position to a range of elevated positions in a lift cycle for elevating the dump chassis, which hoist includes:

A. an extensible and retractable hydraulic cylinder having a ram whose total stroke during the lifting cycle represents the different between its extension in the rest position and its extension at maximum dumping elevation of the dump chassis, B. first and second hoist arms which are connected with said cylinder and with one another for relative pivotal motion about a main pivot axis of said arms, C. a first connection which pivotally connects the first hoist arm with one of the chassis, and D. a second connection which
  1. pivotally connects the second hoist arm with the other chassis,
  2. is substantially closer to the main pivot axis than the first connection is, at the beginning of the lift cycle, so that the effective length of the second arm at the beginning of said cycle is substantially less than that of the first arm,
  3. includes a guide means on the second arm and a shiftable member which is
    a. borne by the other chassis and
    b. capable of relative motion along the length of the guide means during the lift cycle on a path established by the guide means,
  said guide means and shiftable member havng relatively moveable, mutuallly engaging surfaces through which forces imposed by the load are transmitted between the second arm and other chassis at progressively shifting contact zones along the guide means surface as the lift cycle progresses, and
  4. includes sufficient length in the guide means and in the path traversed by the shiftable member for causing the hoist:
    a. to operate, during a first portion of the lift cycle, with the first arm at rest and with the second arm in motion and accompanied by gradual relative motion of said shiftable member along said guide means for substantially increasing the effective length of the second arm during the lift cycle until the second arm is at a predetermined switching angle corresponding to at least about 10 percent of the total stroke of the hydrualic cylinder, and
    b. to engage, during a second portion of the lift cycle after attainment of the switching angle, in scissors motion about the main hoist pivot axis.

4. A dump hoist useful in vehicles including a main chassis and a dump bed having a dump chassis tiltable about a dumping axis for supporting and dumping a load borne by the dump bed, said hoist being moveable from a rest position to a range of elevated positions in a lift cycle for elevating the dump chassis and comprising:

A. an extensible and retractable hydraulic cylinder having a ram whose total stroke during the lifting cycle represents the difference between its extension in the rest position and its extension at maximum dumping elevation of the hoist, B. first and second hoist arms which are connected with said cylinder and with one another for relative pivotal motion about a main pivot axis of said arms, C. a first connection which pivotally connects the first hoist arm with one of the chassis, and D. a second connection which
  1. pivotally connects the second hoist arm with the other chassis,
  2. is substantially closer to the main pivot axis than the first connection is, at the beginning of the lift cycle, so that the effective length of the second arm at the beginning of said cycle is substantially less than that of the first arm, 3. includes a guide means on the second arm and a shiftable member which is
   a. borne by the other chassis and
   b. capable of relative motion along the length of the guide means during the lift cycle on a path established by the guide means, said guide measn and shiftable member having relatively moveable, mutually engaging surfaces through which forces imposed by the load may be transmitted between the second arm and other chassis at progressively shifting contact zones along the guide means surfaces as the lift cycle progresses, and 4. includes sufficient length in the guide means and in the path traversed by the shiftable member for causing the hoist:
   a. to operate, during a first portion of the lift cycle, with the first arm at rest and with the second arm in motion and accompanied by gradual relative motion of said shiftable member along said guide means for substantially increasing the effective length of the second arm during the lift cycle until the second arm is at a predetermined switching angle corresponding to at least about 10 percent of the total stroke of the hydraulic cylinder, and
   b. to engage, during a second portion of the lift cycle after attainment of the switching angle, in scissors motion about the main hoist pivot axis.

5. Apparatus according to any of claim 1, 2, 3 or 4 including preventing means for preventing loads imposed on the second connection by the weight of the dump chassis from shortening the spacing between the main pivot axis and the second connection during at least a portion of the lift cycle.

6. Apparatus according to claim 5 wherein said preventing means includes resilient means connected between said hoist and one of said chassis for opposing such shortening.

7. Apparatus according to claim 6 wherein said resilient means is a spring which is tensioned as the hoist opens for opposing such shortening.

8. Apparatus according to claim 6 wherein said first and second hoist arms are lower and upper hoist arms, respectively, and the resilient means is connected between the lower arm of said hoist and the main chassis.

9. Apparatus according to claim 5 wherein said preventing means includes an inclined load-bearing surface of said guide means.

10. Apparatus according to claim 1 or 3 wherein a load-bearing surface of said guide means is inclined for preventing loads imposed on the second connection by the weight of the dump chassis from shortening the spacing between the main pivot axis and the second connection during at least a portion of the lift cycle and wherein, at any given contact zone along a major portion of said path, a pair of straight reference lines which extend from the center of the contact zone out of that side of the zone nearest the main pivot axis, with the first line also passing through the dumping axis and with the second line constituting an extension of the guide means load-bearing surface inclination at said center, diverge from one another with the second line being further from the main pivot axis than the first.

11. Apparatus according to claim 1 or 3 wherein a load-bearing surface of said guide means is inclined for preventing loads imposed on the second connection by the weight of the dump chassis from shortening the spacing between the main pivot axis and the second connection during at least a portion of the lift cycle and wherein, at any given contact zone along substantially the entire length of said path, a pair of straight reference lines which extend from the center of the contact zone out of that side of the zone nearest the main pivot axis, with the first line also passing through the dumping axis and with the second line constituting an extension of the guide means load bearing surface inclination at said center, diverge from one another with the second line being further from the main pivot axis than the first, thereby providing sufficient inclination of the track surface at said progressive positions along substantially the entire path for preventing loads imposed on said second connection by the weight of the dump chassis from shortening the spacing between the main pivot axis and said second connection during substantially the entire lift cycle.

12. Apparatus according to claim 1, 2, 3 or 4 wherein said first and second hoist arms are lower and upper hoist arms, respectively, and the second connection pivotally connects the, upper hoist arm with the dump chassis, said guide means includes an elongated track on the upper arm, and said shiftable member is borne by the dump chassis.

13. Apparatus according to claim 12 wherein the track is a slot formed on (including in) the upper arm and is curved throughout substantially its entire length.

14. Apparatus according to claim 12 wherein the track is a slot formed on (including in) the upper arm and is straight throughout substantially its entire length.

15. Apparatus according to claim 12 wherein said shiftable member is a roller held in captive relationship with said track for relative motion therein.

16. Apparatus according to claim 12 wherein the track is a slot formed on (including in) the upper arm and is curved throughout substantially its entire length, said shiftable member is a roller held in captive relationship with said slot for relative motion therein and the end of the slot toward which the roller moves during the lift cycle constitutes a stop means defining the switching angle.

17. Apparatus according to claim 12 wherein the track is a slot formed on (including in) the upper arm and is straight throughout substantially its entire length, said shiftable member a roller held in captive relationship with said slot for relative motion therein and the end of the slot toward which the roller moves during the lift cycle constitutes a stop means defining the switching angle.

18. Apparatus according to claim 1 or 3 wherein said first and second hoist arms are lower and upper hoist arms, respectively, said first and second connections pivotally connect the lower and upper hoist arms with the main and dump chassis, respectively, said guide means includes an elongated track located on the upper arm and curved along at least a major portion of the path defined thereby, said shiftable member is borne by the dump chassis, and at any given contact zone along a major portion of said path, a pair of straight reference lines which extend from the center of the contact zone out of that side of the zone nearest the main pivot axis, with the first line also passing through the dumping axis and with the second line constituting an extension of the track surface inclination at said center, diverge from one another with the second line being further from the main pivot axis than the first.

19. Apparatus according to claim 1 or 3 wherein said first and second hoist arms are lower and upper hoist arms, respectively, said first and second connections pivotally connect the lower and upper hoist arms with the main and dump chassis, respectively, said guide means includes an elongated track located on the upper arm and straight along at least a major portion of the path defined thereby, said shiftable member is borne by the dump chassis, and at any given contact zone along a major portion of said path, a pair of straight reference lines which extend from the center of the contact zone out of that side of the zone nearest the main pivot axis, with the first line also passing through the dumping axis and with the second line constituting an extension of the track surface inclination at said center, diverge from one another with the second line being further from the main pivot axis than the first.

20. Apparatus according to claim 1 or 3 wherein said first and second hoist arms are lower and upper hoist arms, respectively, said first and second connections pivotally connect the lower and upper hoist arms with the main and dump chassis, respectively, said guide means includes an elongated track located on the upper arm, said shiftable member is borne by the dump chassis and, at any given contact zone along substantially the entire length of said path, a pair of straight reference lines which extend from the center of the contact zone out of that side of the zone nearest the main pivot axis, with the first line also passing through the dumping axis and with the second line constituting an extension of the track surface inclination at said center, diverge from one another with the second line being further from the main pivot axis than the first, thereby providing sufficient inclination of the track surface at said progressive positions along substantially the entire path for preventing loads imposed on said second connection by the weight of the dump chassis from shortening the spacing between the main pivot axis and said second connection during substantially the entire lift cycle.

21. Apparatus according to claim 1 or 3 wherein the dump axis and the main pivot axis are in substantially the same plane with one another when the hoist is in its rest position.

22. Apparatus according to claim 1, 2, 3 or 4 wherein the connection of said hydraulic cylinder with said arms includes a direct connection of the cylinder with one of said arms and an indirect connection of the other of said arms with said cylinder in that the cylinder and other arm are both connected to a common pivot.

23. Apparatus according to claim 1, 2, 3 or 4 wherein said switching angle corresponds to that position of the hydraulic cylinder in which its longitudinal axis is substantially at a right angle to a reference line drawn through the main hoist pivot axis and through a point of attachment of the cylinder to one of said arms intermediate one of said connections and said main pivot axis.

24. Apparatus according to claim 3 or 4 wherein said switching angle corresponds to extension of the cylinder by an amount in the range of about 10 to about 80 percent of its total stroke in the lifting cycle.

25. Apparatus according to claim 3 or 4 wherein said switching angle corresponds to extension of the cylinder by an amount in the range of about 20 to about 75 percent of its total stroke in the lifting cycle.

26. Apparatus according to claim 3 or 4 wherein said switching angle corresponds to extension of the cylinder by an amount in the range of about 40 to about 70 percent of its total stroke in the lifting cycle.

27. A dumpable vehicle comprising:
I. a vehicle chassis,
II. a dump bed including a dump chassis tiltable about a dumping axis at the rear of the vehicle chassis for supporting and dumping a load borne by the dump bed, and
III. a hoist moveable from a rest position to a range of elevated positions in a lift cycle for elevating the dump chassis, which hoist includes:
  A. an extensible and retractable hydraulic cylinder having a ram whose total stroke during the lifting cycle represents the difference between its extension in the rest position and its extension at maximum dumping elevation of the dump chassis,
  B. lower and upper hoist arms which are connected with said cylinder and with one another for relative pivotal motion about a main pivot axis of said arms, wherein the ram of said hydraulic cylinder is directly connected through a pivot with said upper arm and the other end of the cylinder is indirectly connected with the lower arm through a common pivot,
  C. a first connection which pivotablly connects the lower hoist arm with the vehicle chassis, and
  D. a second connection which
    1. pivotally connects the upper hoist arm with the dump chassis,
    2. is substantially closer to the main pivot axis than the first connection is, at the beginning of the lift cycle, so that "L", the effective length of the upper arm at the beginning of said cycle, is less than about 0.85 of the effective length of the lower arm for providing substantial breakaway torque,
    3. includes a curved slot on the upper arm and a roller which is
      a. borne by the dump chassis and
      b. captively held in said curved slot for relative motion along the length of the slot during the lift cycle on a path established by the slot,
    said slot and roller having relatively moveable, mutually engaging surfaces through which forces imposed by the weight of the dump chassis, including any load thereon, are transmitted between the upper arm and the dump chassis at progressively shifting contact zones along the slot surface as the lift cycle progresses,
    4. includes sufficient length in the slot and in the path traversed by the roller for causing the hoist:
      a. to operate, during a first portion of the lift cycle, with the lower arm at rest and with the upper arm in motion and accompanied by gradual relative motion of said roller along said slot for increasing the effective length of the upper arm to at least about 1.15 L during the lift cycle until the upper arm is at a predetermined switching angle corresponding to about 20 to about 75 percent of the total stroke of the hydraulic cylinder, thereby gradually decreasing the mechanical advantage of the upper arm and increasing the hydraulic efficiency of the hoist, b. to engage, during a second portion of the lift cycle after attainment of the switching angle, in scissors motion about the main hoist pivot axis, and 5. includes sufficient inclination in the contour of the load-bearing surface of said track so that at any given contact zone along substantially the entire length of said path, a pair of straight reference lines which extend from the center of the contact zone out of that side of the zone nearest the main pivot axis, with the first line also passing through the dumping axis and with the second line constituting an extension of the track surface inclination at said center, diverge from one another with the second line being further from the main pivot axis than the first, thereby providing sufficient inclination of the track surface at said porgressive positions along substantially the entire path for preventing loads imposed on said second connection by the weight of the dump chassis from shortening the spacing between the main pivot axis and said second connection during substantially entire lift cycle.

28. Apparatus according to claim 27 wherein L is less than about 0.7 of the effective length of the lower arm at the beginning of the lift cycle, and the slot is sufficiently long to increase the effective length of the upper arm to at least about 1.25 L at the switching angle while providing a switching angle in the range of about 40 to about 70 percent of the stroke of the hydraulic cylinder.

29. A hoist mechanism for use in raising and lowering a dump bed pivotally connected to a vehicle chassis at a chassis-to-bed pivotal connection, said hoist mechanism comprising:

a first and a second lifting arm connected at a first pivot point and said lifting arms having a rest position, said first lifting arm having a second pivot point at one end thereof, said first and second pivot points being in substantially the same plane as said chassis-to-bed pivotal connection when the arms are in their rest position, said second lifting arm having engaging means which includes stop means and is located on one end of the second lifting arm for gradually increasing the effective length of said second lifting arm as said second lifting arm is rotated around said first pivot point from the rest position until said second lifting arm forms a predetermined angle with respect to said first lifting arm; and an extensible and retractable hydraulic cylinder means for raising and lowering said lifting arms, said hydraulic cylinder means being connected to said second lifting arm;

said hydraulic cylinder means and said engaging means being so arranged that upon initial extension of said cylinder means, said first lifting arm remains stationary relative to said second pivot point in the rest position as said second lifting arm rotates around said first pivot point from the rest position until said second lifting arm reaches said predetermined angle with respect to said first lifting arm;

said stop means being so located that when said second lifting arm reaches said predetermined angle and thereafter as said angle is exceeded said stop means causes said first lifting arm to rotate around said second pivot point upon further extension of said hydraulic cylinder means thereby to increase the rate of lifting of the dump bed relative to the amount of cylinder extension.

30. A hoist mechanism as claimed in claim 29 wherein the effective length of said second arm increases in direct proportion to the increase in the angle between the lifting arms.

31. A hoist mechanism as claimed in claim 29 wherein said engaging means includes a shaft and wherein said second lifting arm includes means for receiving said shaft, said receiving means being of a size and shape such that said shaft can move about therein between at least two positions as said hoist mechanism is raised and lowered, said shaft being confined within said receiving means.

32. A hoist mechanism as claimed in claim 31 wherein said receiving means is an elongated track, said shaft being attachable to said vehicle.

33. A hoist mechanism as claimed in claim 32 wherein said shaft is attachable to said dump body.

34. A hoist mechanism as claimed in claim 33 wherein said shaft is located at one end of said track when said dump bed is in the rest position and at the second end of said track when said lifting arms are at said predetermined angle.

35. A hoist, mechanism as claimed in claim 34 wherein said engaging means includes a roller which surrounds a portion of said shaft encompassed by said receiving means.

36. A hoist mechanism as claimed in claim 35 wherein said track is an elongated loop having a height approximately equal to the outer diameter of said roller.

37. A hoist mechanism as claimed in claim 36 wherein said engaging means includes a pair of brackets fixedly attached to the end of said shaft, said brackets being attachable to the dump vehicle.

38. A hoist mechanism as claimed in claim 29 wherein said lifting arms have straight bottom surfaces which are located above said vehicle chassis when the lifting arms are in the rest position.

39. In the combination of a dump truck comprised of a dump bed pivotally connected to a truck chassis frame at a chassis-to-bed pivotal connection and wherein there is a hoist mechanism located between the dump bed and truck chassis frame for pivotally raising and lowering the dump bed with respect to the truck chassis frame, said hoist mechanism including a first and a second lifting arm connected at a first pivot point, said lifting arms having a rest position, said first lifting arm having a second pivot point at one end thereof, said first and second pivot points being in substantially the same plane as said chassis-to-bed pivotal connection when the arms are in their rest position, said second lifting arm having engaging means which includes stop means and is located on one end of the second lifting arm for gradually increasing the effective length of said second lifting arm as said second lifting arm is rotated around said first pivot point until said second lifting arm forms a predetermined angle with respect to said first lifting arm; and an extensible and retractable hydraulic cylinder means for raising and lowering said lifting arms, said hydraulic cylinder means being connected to said second lifting arm;

said hydraulic cylinder means and said engaging means being so arranged that upon initial extension of said cylinder means, said first lifting arm remains stationary relative to said second pivot point in the rest position as said second lifting arm rotates around said first pivot point from the rest position until said second lifting arm reaches said predetermined angle with respect to said first lifting arm; said stop means being so located that when said second lifting arm reaches said predetermined angle and thereafter as said angle is exceeded said stop means causes said first lifting arm to rotate around said second pivot point upon further extension of said hydraulic cylinder means thereby to increase the rate of lifting of the dump bed relative to the amount of cylinder extension.

40. The hoist mechanism as claimed in claim 39 wherein the effective length of said second arm increases in direct proportion to the increase in the angle between the lifting arms.

41. A hoist mechanism as claimed in claim 39 wherein said engaging means includes a shaft and wherein said second lifting arm includes means for receiving said shaft,
said receiving means being of a size and shape such that said shaft can move about therein between at least two positions as said hoist mechanism is raised and lowered,
said shaft being confined within said receiving means.

42. A hoist mechanism as claimed in claim 41 wherein said receiving means is an elongated track,
said shaft being attachable to said vehicle.

43. A hoist mechanism as claimed in claim 42 wherein said shaft is attachable to said dump body.

44. A hoist mechanism as claimed in claim 43 wherein said shaft is located at one one end of said track when said dump bed is in the rest position and at the second end of said track when said lifting arms are at said predetermined angle.

45. A hoist mechanism as claimed in claim 44 wherein said engaging means includes a roller which surrounds a portion of said shaft encompassed by said receiving means.

46. A hoist mechanism as claimed in claim 45 wherein said track is an elongated loop having a height approximately equal to the outer diameter of said roller.

* * * * *